(12) United States Patent
Yan

(10) Patent No.: US 12,017,820 B2
(45) Date of Patent: Jun. 25, 2024

(54) CUSHION PAD AND PACKAGING BAG THEREOF

(71) Applicants: BETA (SHENZHEN) PACKAGE PRODUCTS CO., LTD, Shenzhen (CN); HUIZHOU BETA PACKTECH CO., LTD, Guangdong (CN)

(72) Inventor: Jinwei Yan, Shenzhen (CN)

(73) Assignees: BETA (SHENZHEN) PACKAGE PRODUCTS CO., LTD, Shenzhen (CN); HUIZHOU BETA PACKTECH CO., LTD, Huizhou (CN)

( * ) Notice: Subject to any disclaimer, the term of this patent is extended or adjusted under 35 U.S.C. 154(b) by 0 days.

(21) Appl. No.: 18/208,908

(22) Filed: Jun. 13, 2023

(65) Prior Publication Data
US 2023/0322445 A1 Oct. 12, 2023

Related U.S. Application Data

(60) Continuation-in-part of application No. 17/223,029, filed on Apr. 6, 2021, now Pat. No. 11,731,808,
(Continued)

(30) Foreign Application Priority Data

Mar. 29, 2019 (CN) .......................... 201910252856.0
Mar. 29, 2019 (CN) .......................... 201920419356.7
(Continued)

(51) Int. Cl.
*B65D 30/08* (2006.01)
*B31B 70/00* (2017.01)
(Continued)

(52) U.S. Cl.
CPC ............ *B65D 31/02* (2013.01); *B31B 70/005* (2017.08); *B31B 70/02* (2017.08); *B31B 70/024* (2017.08);
(Continued)

(58) Field of Classification Search
CPC ...... B65D 31/02; B65D 65/406; B65D 65/44; B65D 65/466; B65D 81/03; B32B 1/00; B32B 3/266; B32B 29/005; B32B 2439/06
(Continued)

(56) References Cited

U.S. PATENT DOCUMENTS

2022/0002059 A1* 1/2022 Asayama ............... B65D 81/03
2022/0143946 A1* 5/2022 Talda ..................... B65D 81/03

FOREIGN PATENT DOCUMENTS

CN 211944411 U * 11/2020
CN 112373949 A * 2/2021
(Continued)

OTHER PUBLICATIONS

Machine translation of JP2010-202280A.*

*Primary Examiner* — Jes F Pascua

(57) ABSTRACT

The present disclosure providing a cushion pad includes at least one cushion unit including at least one die-cutting region, a length of the die-cutting region increased when the die-cutting region is unfolded; the die-cutting region is unfolded to form a buffer layer that causes the second surface to expand in a thickness direction of the second surface to play a buffering and protective role thereof; the die-cutting region is unfolded to form a three-dimensional network structure. The present disclosure also provides that a packaging bag with the cushion unit is of a plane structure after production; when the packaging bag is used after being transportation, an object is put into the packaging bag or
(Continued)

applying a pushing force to the packaging bag so that the cushion unit is expanded to form the buffer layer, to protect the object inside the packaging bag.

16 Claims, 22 Drawing Sheets

Related U.S. Application Data which is a continuation-in-part of application No. 16/878,645, filed on May 20, 2020, now abandoned, which is a division of application No. 16/795,554, filed on Feb. 19, 2020, now Pat. No. 10,850,891, said application No. 17/223,029 is a continuation-in-part of application No. PCT/CN2019/121161, filed on Nov. 27, 2019, and a continuation-in-part of application No. PCT/CN2019/110740, filed on Oct. 12, 2019, and a continuation-in-part of application No. PCT/CN2019/090469, filed on Jun. 10, 2019.

(30) Foreign Application Priority Data

| | | | |
|---|---|---|---|
| Aug. 8, 2019 | (CN) | ................. | 201910731634.7 |
| Mar. 3, 2021 | (CN) | ................. | 202110237367.5 |
| Aug. 22, 2022 | (CN) | ................. | 202211009671.5 |

(51) Int. Cl.
| | |
|---|---|
| *B31B 70/02* | (2017.01) |
| *B31B 70/14* | (2017.01) |
| *B31B 70/16* | (2017.01) |
| *B31B 70/20* | (2017.01) |
| *B31B 70/26* | (2017.01) |
| *B31B 70/62* | (2017.01) |
| *B31D 5/00* | (2017.01) |
| *B32B 1/00* | (2006.01) |
| *B32B 3/26* | (2006.01) |
| *B32B 29/00* | (2006.01) |
| *B65D 65/40* | (2006.01) |
| *B65D 65/46* | (2006.01) |
| *B65D 81/02* | (2006.01) |
| *B65D 81/03* | (2006.01) |

(52) U.S. Cl.
CPC ............ *B31B 70/142* (2017.08); *B31B 70/16* (2017.08); *B31B 70/20* (2017.08); *B31B 70/26* (2017.08); *B31B 70/62* (2017.08); *B31D 5/0065* (2013.01); *B32B 1/00* (2013.01); *B32B 3/266* (2013.01); *B32B 29/005* (2013.01); *B65D 65/406* (2013.01); *B65D 65/44* (2013.01); *B65D 65/466* (2013.01); *B65D 81/03* (2013.01); *B32B 2439/06* (2013.01)

(58) Field of Classification Search
USPC .............................................................. 383/1
See application file for complete search history.

(56) References Cited

FOREIGN PATENT DOCUMENTS

| | | | | | |
|---|---|---|---|---|---|
| JP | 2010202280 A | * | 9/2010 | ............ | B65D 27/02 |
| JP | 2017193373 A | * | 10/2017 | | |
| JP | 2017193376 A | * | 10/2017 | | |
| JP | 2019031012 A | * | 2/2019 | | |
| JP | 2019099223 A | * | 6/2019 | | |
| JP | 2019099231 A | * | 6/2019 | | |
| WO | WO-9601731 A1 | * | 1/1996 | ........... | B31D 1/0031 |
| WO | WO-2012063916 A1 | * | 5/2012 | ........... | A47G 21/001 |
| WO | WO-2021060416 A1 | * | 4/2021 | | |
| WO | WO-2022182691 A1 | * | 9/2022 | | |

* cited by examiner

CUSHION PAD AND PACKAGING BAG THEREOF

CROSS-REFERENCE TO RELATED APPLICATIONS

This application is a continuation-in-part of U.S. application Ser. No. 17/223,029, filed on Apr. 6, 2021, which is a continuation-in-part of U.S. application Ser. No. 16/878,645, filed on May 20, 2020, which is a division of U.S. application Ser. No. 16/795,554, filed on Feb. 19, 2020. U.S. application Ser. No. 17/223,029, filed on Apr. 6, 2021, is a continuation-in-part of International Application No. PCT/CN2019/121161, filed on Nov. 27, 2019, and is a continuation-in-part of International Application No. PCT/CN2019/110740, filed on Oct. 12, 2019, and is a continuation-in-part of International Application No. PCT/CN2019/090469, filed on Jun. 10, 2019. This application claims priority to Chinese Application No. 202211009671.5, filed on Aug. 22, 2022, Chinese Application No. 202110237367.5, filed on Mar. 3, 2021, Chinese Application No. 201910731634.7, filed on Aug. 8, 2019, Chinese Application No. 201920419356.7, filed on Mar. 29, 2019, and Chinese Application No. 201910252856.0, filed on Mar. 29, 2019. The entire contents of all of the above-identified patent applications are incorporated herein by reference.

BACKGROUND

Technical Field

The present disclosure generally relates to the field of packaging applied to express deliveries, and especially relates to a cushion pad and a packaging bag made of the cushion pad.

Description of Related Art

In the field of packaging, a cushion pad is mainly configured to protect objects that have been packaged, so that the cushion pad needs to have a cushioning function, such as a conventional inflatable bubble structure. The cushion pad configured to play a buffering role is that the cushion pad has the buffering effect along a thickness direction of the cushion pad, so that a thickness of the cushion pad is relatively large. A transportation cost is a main reason that seriously restricts a cost of the cushion pad, and when a packaging bag made of the cushion pad or the cushion pad is transported to other countries and regions, a volume of the cushion pad is increased due to a relatively large thickness of the cushion pad, so that the cushion pad and the packaging bag with a larger volume need to pay more transportation costs.

A die-cutting region arranged on a die-cutting paper or a paper is mainly to form cutting slits with different structures by die-cutting the paper material, and then an external force is applied to the cutting slits, so that the cutting slits can be stretched and wrinkled to form a three-dimensional network structure that can play a buffering and protective role thereof.

At present, materials that wrap around an outer surface of an object to directly play a buffering role mainly include: a bubble film structure and a plastic foam, etc., which are not environmentally friendly. Of course, the three-dimensional network structure that the die-cutting paper has been stretched can also be directly wrapped around the outer surface of the object to play the buffering role. However, it is necessary to stretch the die-cutting paper, and most of the die-cutting paper is stretched manually. During in the manual stretching process, because a stretching point is occurred in a hand so that a force is unevenly applied, in this way, it is easy to lead to only one part of the die-cutting paper to be stretched, and the other part of the die-cutting paper not to be stretched; or the die-cutting paper is damaged due to apply an excessive tension force to the die-cutting paper when the die-cutting paper is stretched.

Of course, the die-cutting paper can be used to produce a packaging bag. At present, the packaging bag made of the die-cutting paper mainly includes: setting a three-dimensional network structure that is formed by stretching the die-cutting paper inside a paper outer bag body, and pasting the three-dimensional network structure onto inner walls of the outer bag body. In this way, on one hand, the overall packaging bag is made of a paper material, so that pollutions to the environment can be reduced; and on the other hand, the buffering effect of the packaging bag can be ensured. However, a thickness of the packaging bag after production is relatively large, so that the transportation cost is very difficult to be reduced; at the same time, the die-cutting paper needs to be fixed on the inner walls of the outer bag body by the three-dimensional network structure that has been stretched, so that the die-cutting paper needs to be stretched during manufacturing the packaging bag, and a specific structure of the three-dimensional network structure needs to be kept to be fixed within the outer bag body, which is a complex production process.

SUMMARY

The technical problems to be solved: in view of the shortcomings of the related art, the present disclosure provides a cushion pad which can solve problems of the related art above mentioned.

A cushion pad according to an embodiment of the present disclosure of the present disclosure is made of a paper material and includes at least one cushion unit, each of the at least one cushion unit including at least one layer of third surface, each of the at least one layer of third surface including a die-cutting region, and a transferring region arranged at a center of the third surface and being a strip-shaped region arranged along a width direction of the third surface; the die-cutting region arranged on a side of the transferring region; the transferring region configured to transmit a tensile force to the die-cutting region to unfold the die-cutting region, a buffer layer formed by the die-cutting region that has been unfolded, and configured to cause the third surface to expand along a thickness direction of the third surface to play a buffering and protective role thereof.

A cushion pad according to another embodiment of the present disclosure of the present disclosure is made of a paper material and includes at least one cushion unit, each of the at least one cushion unit including:

a first surface including at least one extension region that can be unfolded along a length direction of the first surface, and wherein a length of the first surface is increased after the extension region is unfolded;

at least one layer of second surface, two ends of the second surface along a length direction of the second surface respectively fixed at two ends of the first surface, a die-cutting region arranged on the second surface, and a length of the die-cutting region increased along with the extension region when the extension region is unfolded; and wherein the die-cutting region is unfolded to form a buffer layer that causes the second surface to expand along a thickness direction of the second surface to play a buffering and protective role thereof; and wherein a three-dimensional network structure is formed after the die-cutting region is unfolded.

After the cushion unit of the present disclosure is stretched and unfolded by an external force, the third surface expands in the thickness direction thereof to be used as a buffering material for wrapping around a surface of an object; moreover, as a paper material, the cushion unit can be degraded after being used, which is more environmentally friendly; when the cushion pad is made into a plane shape structure and is then unfolded into a three-dimensional network structure during being used after transportation, a transportation cost of the plane shape structure can be saved compared with a three-dimensional product with a larger volume.

A packaging bag according to an embodiment of the present disclosure is produced by an cushion unit and includes:

an outer bag body;
the cushion unit mentioned above, the cushion unit arranged on the outer bag body along a length direction of the cushion unit, and two sides of the cushion unit along a width direction of the cushion unit unconnected to the outer bag body; and wherein
when an object is put into to the packaging bag, a direction that the object is put into the packaging bag is consistent with the length direction of the cushion unit; the cushion unit unfolded along the direction that the object is put into the packaging bag, and expanded in a thickness direction of the cushion unit, to play a buffering and protective role thereof.

The packaging bag of the present disclosure is made of the cushion unit and is of a plane structure after being manufactured, and a cost can be saved during transportation of the plane structure; when the packaging bag is used, the object can be directly placed inside the packaging bag, the cushion unit within the packaging bag can be unfolded due to a gravity of the object or a pushing force that the object is put into the packaging bag, the buffer layer with the three-dimensional network structure is formed to provide a buffering effect for the packaging bag; the packaging bag does not need to manufacture the buffer layer in a shape of the three-dimensional network structure inside the packaging bag, and a manufacturing process is relatively simple; the bag body can form the buffer layer when the object is put into the packaging bag, so that a usage of the packaging bag is relatively simple.

DETAILED DESCRIPTION

The present disclosure will be further illustrated and described with reference to embodiments, examples and the accompanying drawings of the specification.

Figure 1:
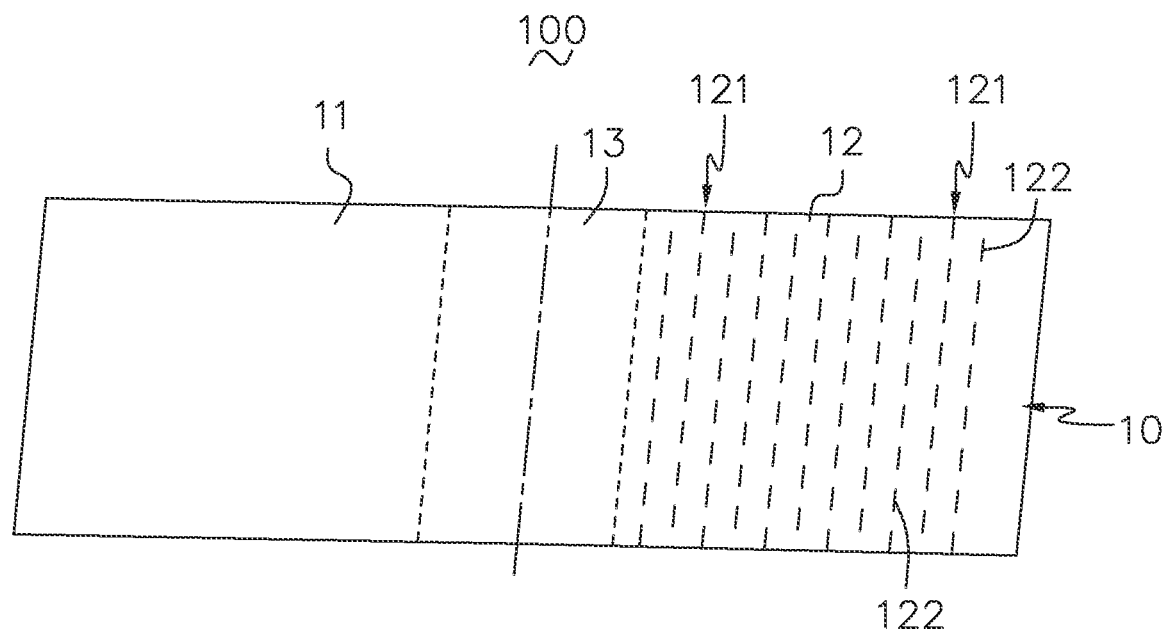
FIG. 1 is a schematic view of a cushion unit in accordance with an embodiment of the present disclosure.
Figure 2:
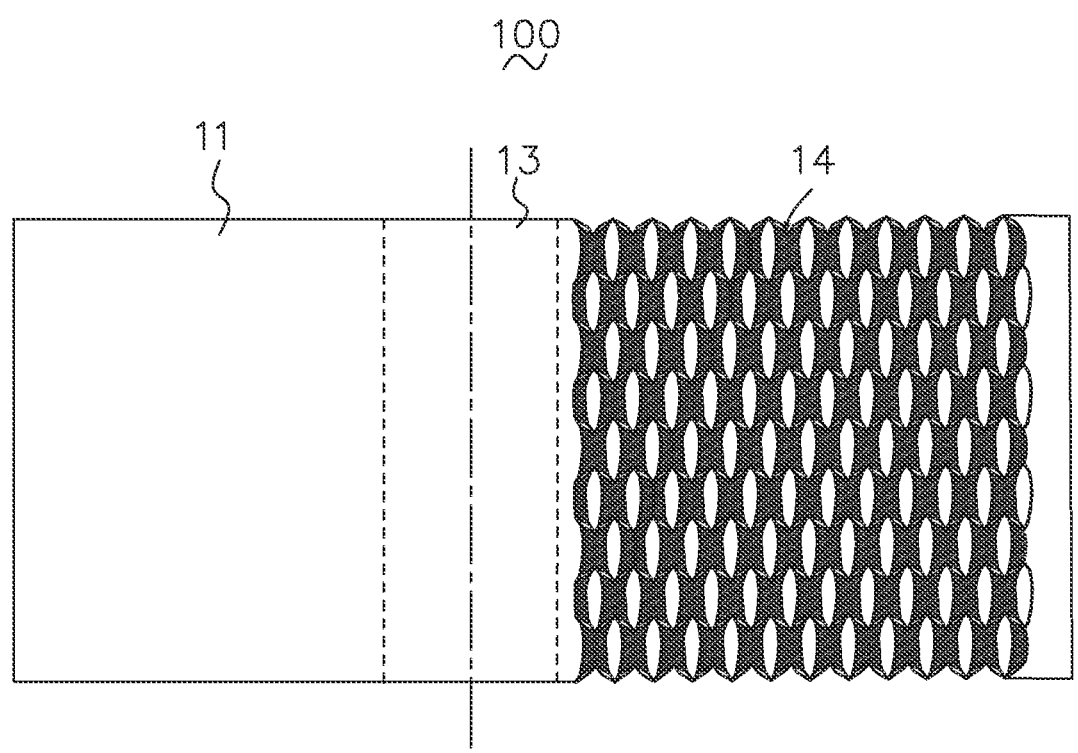
FIG. 2 is a schematic view of the cushion unit of the present disclosure, shown the cushion unit is unfolded.

Referring to FIG. 1 and FIG. 2, the present disclosure provides a cushion pad 100 made of a paper material, which can be degraded or recycled after the cushion pad 100 is used as a cushion filling material or an outer packaging material.

The cushion pad 100 includes at least one cushion unit 10, each of the at least one cushion unit 10 including at least one layer of third surface 11. Each of the at least one layer of third surface 11 includes a die-cutting region 12, and a transferring region 13 arranged at a center of the third surface 11 and being a strip-shaped region arranged along a width direction of the third surface 11; the die-cutting region 12 arranged on a side of the transferring region 13; the transferring region 13 configured to transmit a tensile force to the die-cutting region 12 to completely unfold the die-cutting region 12, a buffer layer 14 formed by the die-cutting region 12 that has been unfolded, and configured to cause the third surface 11 to expand along a thickness direction of the third surface 11 to play a buffering and protective role thereof.

In an embodiment of the present disclosure, the die-cutting region 12 that has been die-cut refers that a plurality of cutting slits 122 is cut on a paper material by a die-cutting mode, two adjacent rows of cutting slits 122 are staggered with each other. When an external force is applied to the die-cutting region 12, the plurality of cutting slits 122 is stretched into a three-dimensional structure, to form a three-dimensional network structure thereof. The plurality of cutting slits 122 is generally a three-dimensional hexagonal or a three-dimensional square after the plurality of cutting slits 122 is stretched. At this time, a length of the die-cutting region 12 is increased and a thickness of the die-cutting region 12 is also expanded to form the buffer layer 14, thereby playing a buffering and protective role thereof.

A specific configuration of the die-cutting region 12 includes: a plurality of cutting lines 121 arranged by rows, each of the plurality of cutting lines 121 including a plurality of cutting slits 122 distributed at intervals, the plurality of cutting slits 122 of two adjacent cutting lines 121 arranged in a staggered manner; a length and a cutting interval of the cutting slit 122 of each of the plurality of cutting lines 121 are the same; the plurality of cutting slits 122 forms a three-dimensional hexagonal structure after this type of die-cutting region 12 is stretched.

In an embodiment of the present disclosure, a thickness of the cushion pad 100 is equal to a thickness of the paper when the cushion pad 100 is not unfolded, and at this time, the cushion pad 100 can be transported to overseas markets by means of freight, which can save transportation costs; the cushion pad 100 is stretched manually or by a stretching device to unfold the die-cutting region 12 when the cushion pad 100 is used by a customer; in this way, the cushion pad 100 is expanded in a thickness direction of the cushion pad 100, which can be used as a cushion material.

Figure 3:
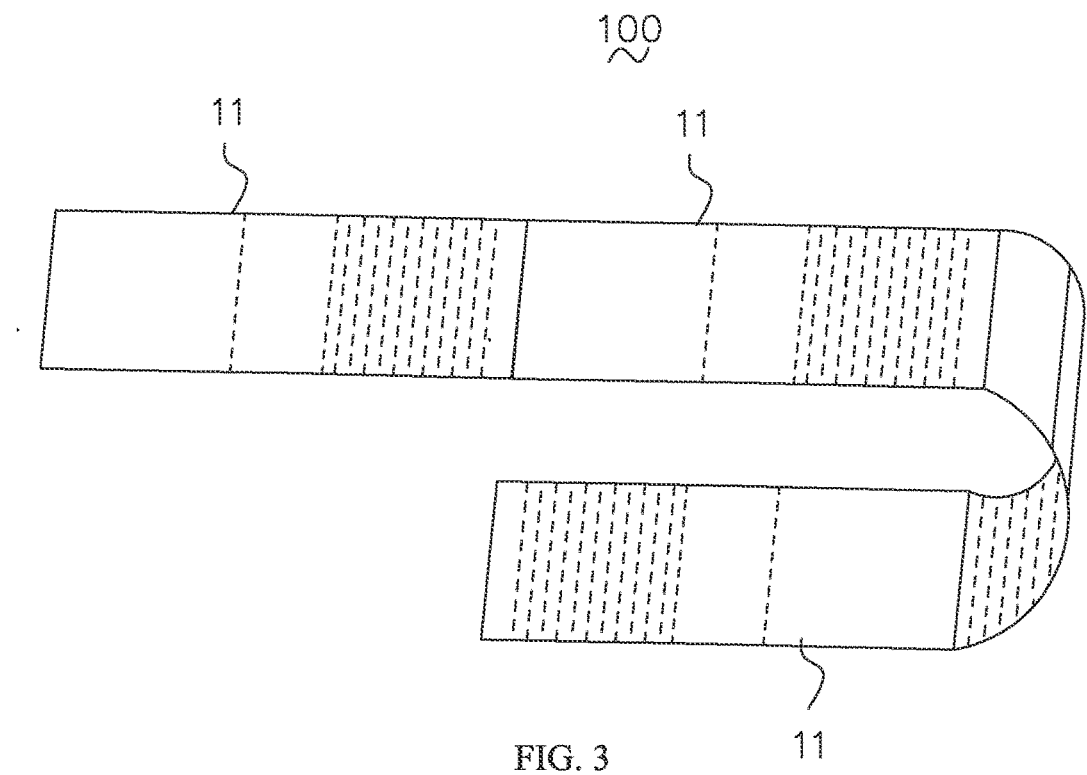
FIG. 3 is a schematic view of a cushion pad in accordance with an embodiment of the present disclosure.

Referring to FIG. 3, the at least one cushion unit 10 includes a plurality of cushion units 10 connected end to end. The cushion pad 100 connected by the plurality of cushion units 10 is in a strip-shaped structure, which is beneficial for stretching the strip to form the buffer layer 14, and on the other hand, when the cushion pad 100 is wrapped around an outer side of an object, the plurality of cushion units 10 can be wrapped for a plurality of layers around the outer side of the object, to further enhance the buffering effect thereof.

Figure 4:
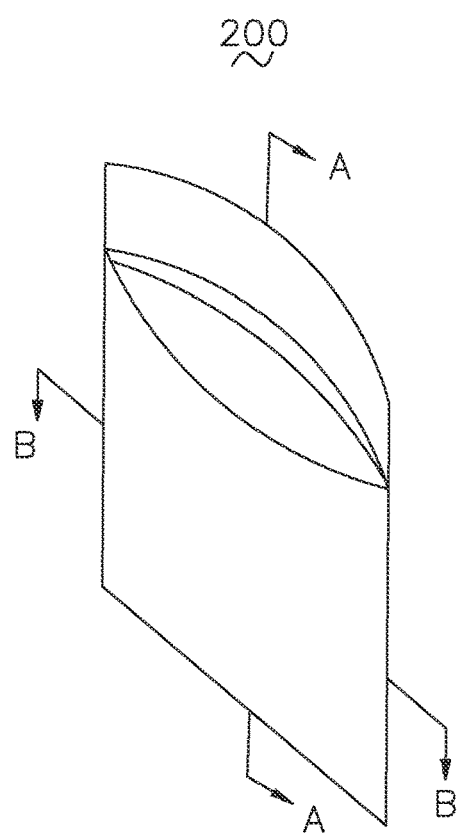
FIG. 4 is a schematic view of a packaging bag in accordance with an embodiment of the present disclosure.
Figure 5:
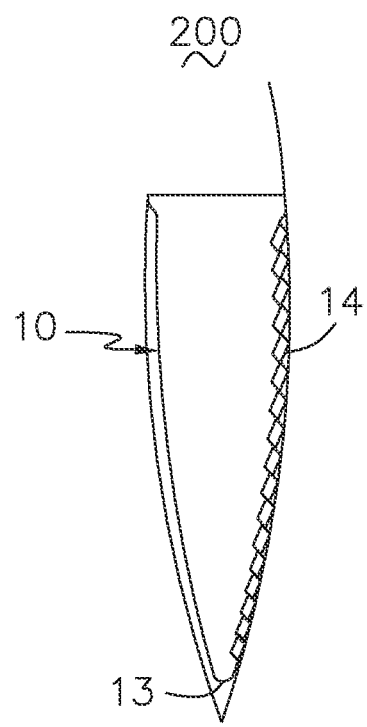
FIG. 5 is a side cross-sectional view of the packaging bag produced by the cushion unit of FIG. 1.
Figure 6:
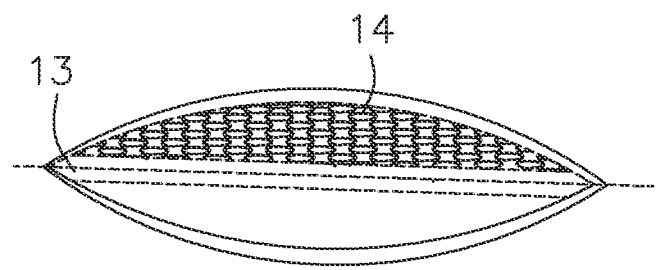
FIG. 6 is a top cross-sectional view of the packaging bag produced by the cushion unit of FIG. 1.

Referring to FIG. 4 to FIG. 6, the present disclosure also produces a packaging bag 200 by using the cushion pad 100, a thickness of the packaging bag 200 is thinner before the packaging bag 200 is used, which can effectively save transportation costs during transportation. The packaging bag 200 with a buffering function is changed into a packaging structure with an increased thickness only when the packaging bag 200 is unfolded to be used by an external force after transportation. In an optimal unfolding method is that: when the object is placed inside the packaging bag 200, the cushion unit 10 is unfolded inside the packaging bag 200 to form the buffer layer 14 due to a gravity of the object or a pushing force that the object is placed inside the packaging bag 200, so as to obtain a buffering effect thereof.

Specifically, the packaging bag 200 includes an outer bag body 20 and a cushion unit 10 arranged on the outer bag body 20 along a length direction of the cushion unit 10, and two sides of the cushion unit 10 along a width direction of the cushion unit 10 unconnected to the outer bag body 20, so that the die-cutting region 12 can be conveniently unfolded; when the object is put into to the packaging bag 200, a direction that the object is put into the packaging bag 200 is consistent with the length direction of the cushion unit 10; the cushion unit 10 is unfolded along the direction that the object is put into the packaging bag 10, and expanded in a thickness direction of the cushion unit 10, to play a buffering and protective role thereof.

In an embodiment of the present disclosure, two ends of the cushion unit 10 along the length direction of the cushion unit 10 are respectively arranged near an inner wall of an opening of the outer bag body 20, and a center position of the cushion unit 10 is suspended in the outer bag body 20; after the cushion unit 10 is unfolded along the direction that the object is put into the packaging bag 200, the center position of the cushion unit 10 moves to a bottom portion of the outer bag body 20, so that the buffer layer 14 can basically cover a whole side surface of the outer bag body 20, to ensure the buffering effect of the packaging bag 200.

Figure 7:
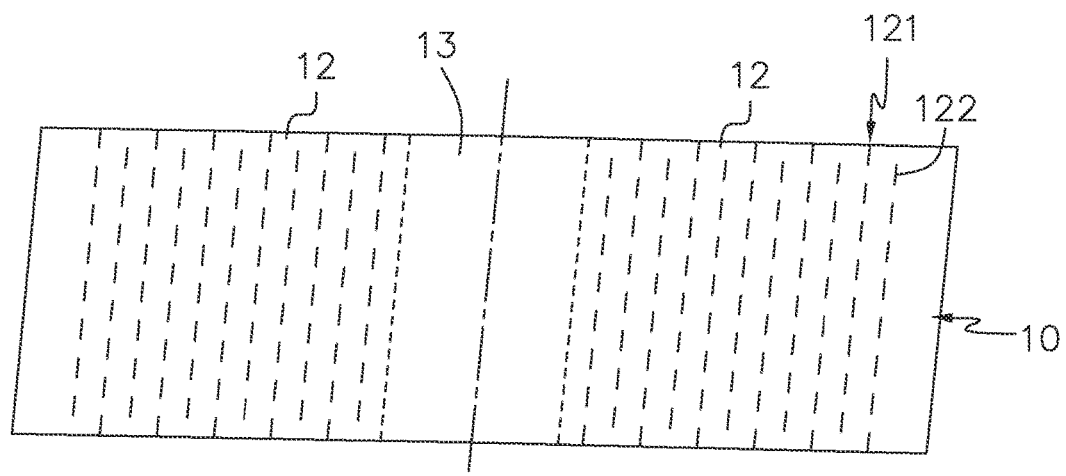
FIG. 7 is a schematic view of a cushion unit in accordance with another embodiment of the present disclosure.
Figure 8:
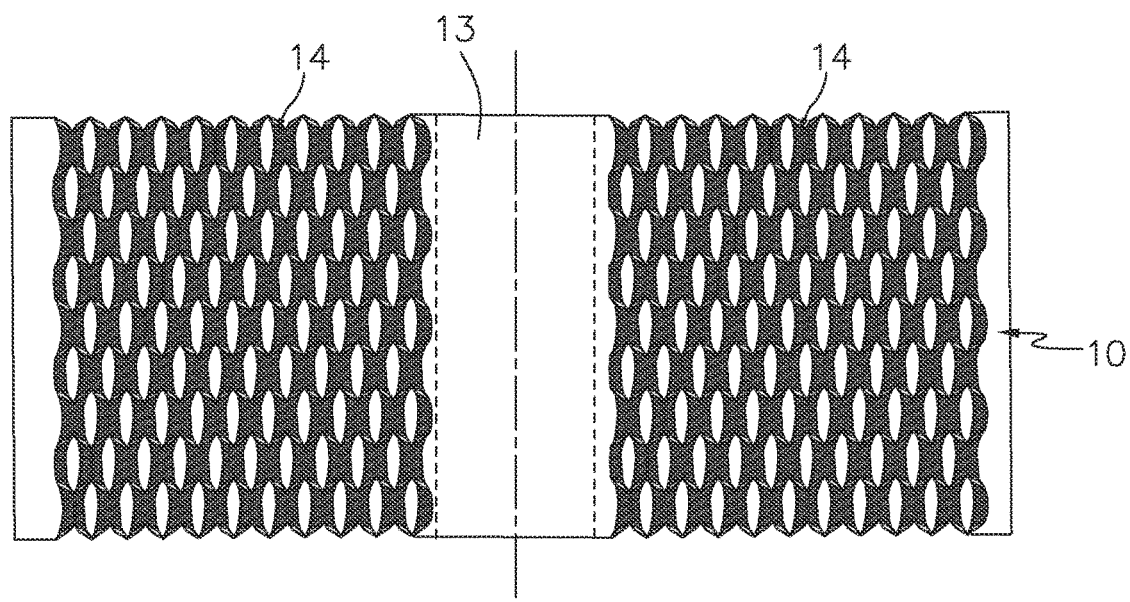
FIG. 8 is a schematic view of the cushion unit of FIG. 7, shown the cushion unit is unfolded.

Referring to FIG. 7 and FIG. 8, in another embodiment of the present disclosure, each cushion unit 10 includes two die-cutting regions 12 respectively arranged at two ends of the transferring region 13. When it is necessary to unfold the cushion unit 10, one of the two die-cutting regions 12 is stretched by an external force, so that the tensile force is uniformly transmitted to the other of the two die-cutting regions 12 through the transferring region 13, to unfold the other of the two die-cutting regions 12; the transferring region 13 is provided to effectively prevent stretching distortion caused by a non-uniform tensile force when the other of the two die-cutting regions 12 is unfolded, for example, some regions of the other of the two die-cutting regions 12 are unfolded to form a three-dimensional network structure, and the other regions of the other of the two die-cutting regions 12 can't be unfolded; in addition, the two die-cutting regions 12 are provided to have a higher buffer utilization rate after the two die-cutting regions 12 are unfolded relative to the structure that has only one die-cutting region 12, and the buffer layer 14 has a larger wrapping range and a better buffering effect when the cushion unit 10 is wrapped or used as a filling material.

Figure 9:
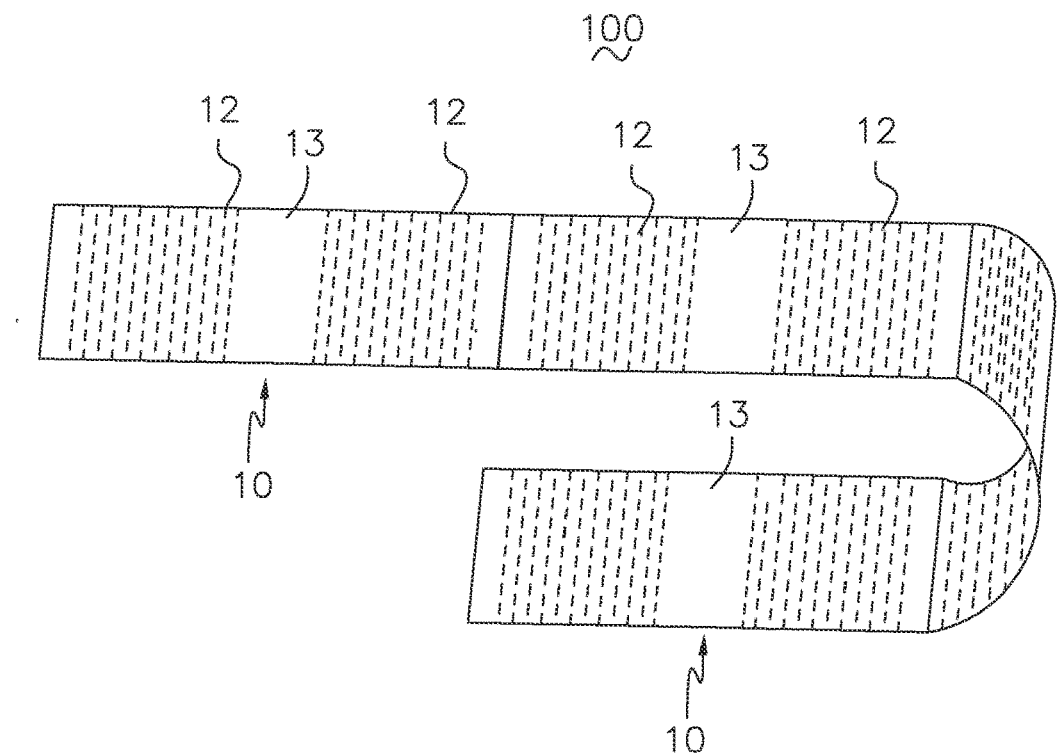
FIG. 9 is a schematic view of a cushion pad produced by the cushion unit of FIG. 7.

Referring to FIG. 9, the plurality of cushion units 10 having the two die-cutting regions 12 are connected end to end to form the cushion pad 100. This type of cushion pad 100 is wrapped around the surface of the object after the cushion pad 100 is stretched, the buffering effect can be further enhanced relative to the cushion pad 100 with only one die-cutting region 12.

Figure 10:
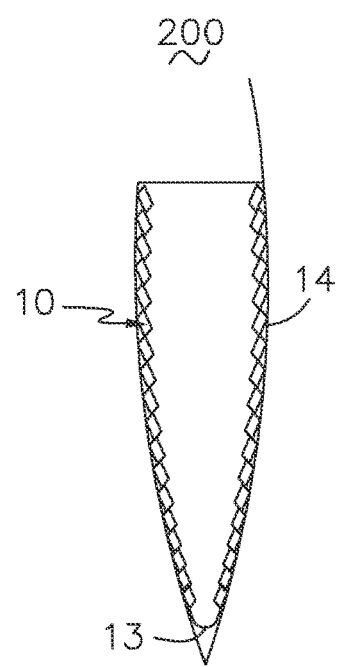
FIG. 10 is a side cross-sectional view of a packaging bag produced by the cushion unit of FIG. 7.
Figure 11:
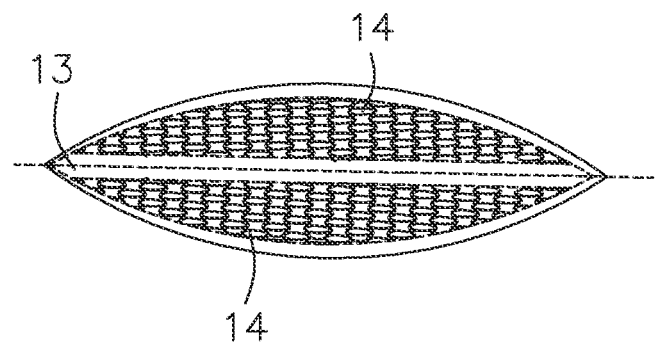
FIG. 11 is a top cross-sectional view of the packaging bag produced by the cushion unit of FIG. 7.

Referring to FIG. 10 and FIG. 11, the packaging bag 200 can also be manufactured by using the packing unit 10 of the present embodiment of the present disclosure, and specifically, the packaging bag 200 includes an outer bag body 20 and a packing unit 10 with two die-cutting regions 12. When the object is put into the packaging bag 200, a direction that the object is put into the packaging bag 200 is consistent with the length direction of the cushion unit 10, the two die-cutting regions 12 of the cushion unit 10 are unfolded along the direction that the object is put into the packaging bag 200, two buffer layers 14 are formed on two side surfaces of the packaging bag 200, and expanded in the thickness direction of the cushion unit 10, thereby playing a buffering and protective role thereof. Such packaging bag 200 can overcome a destructive force from any direction of the two side surfaces of the packaging bag 200.

Similarly, two ends of the cushion unit 10 along the length direction of the cushion unit 10 are respectively arranged near the inner wall of the opening of the outer bag body 20, and a center position of the cushion unit 10 is suspended in the outer bag body 20; after the cushion unit 10 is unfolded along the direction that the object is put into the packaging bag 200, the center position of the cushion unit 10 moves to a bottom portion of the outer bag body 20, so that the buffer layer 14 can cover the whole side surface of the outer bag body 20, even cover the whole two side surfaces of the outer bag body 20, thereby ensuring that the protection bag has the better buffering effect.

Figure 12:
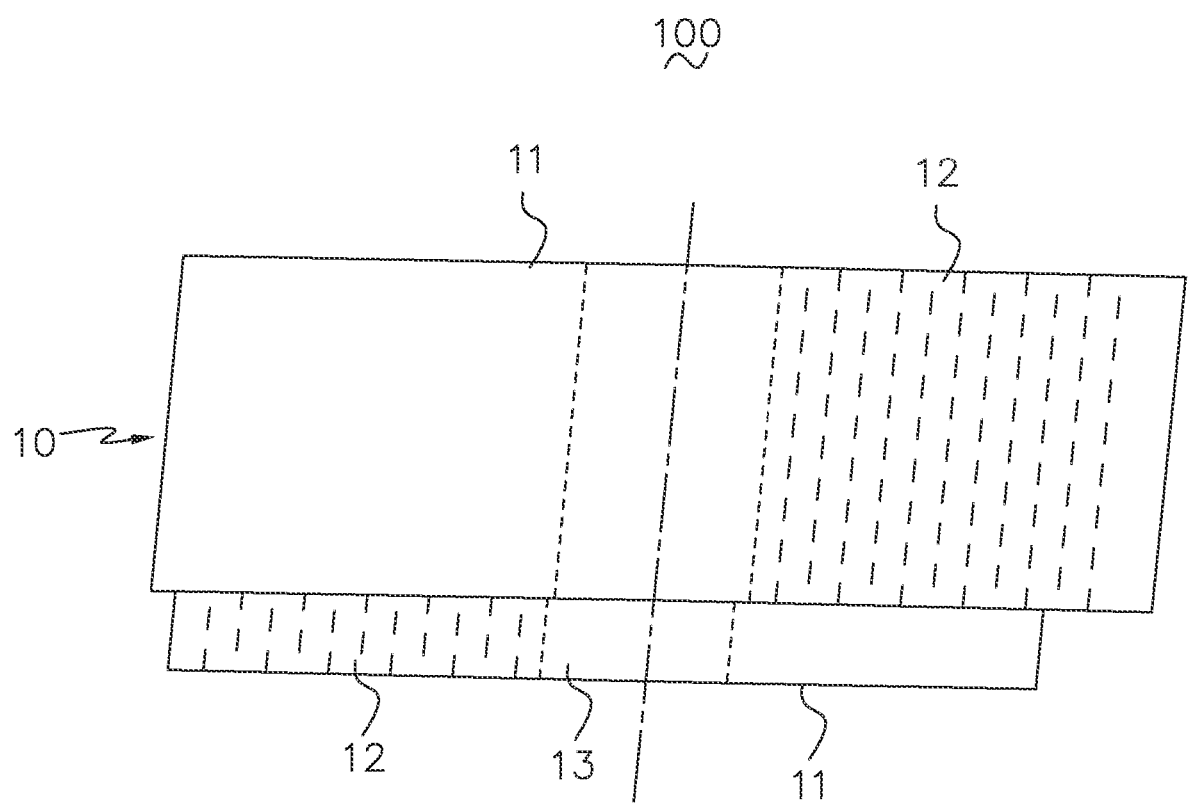
FIG. 12 is a schematic view of a cushion unit in accordance with a third embodiment of the present disclosure.

Referring to FIG. 12, in another embodiment of the present disclosure, the cushion unit 10 can include a plurality of third surfaces 11, and two ends of the plurality of third surfaces 11 are connected to each other; at this time, the plurality of third surfaces 11 can include only one die-cutting region 12, or include two die-cutting regions 12, or a combination of the cushion unit 10 with one die-cutting region 12 and the cushion unit 10 with two die-cutting regions 12. In the present embodiment, the die-cutting region 12 with the plurality of third surfaces 11 form the buffer layer 14 with a three-dimensional network structure after the plurality of third surfaces 11 is stretched, that is, a plurality of buffer layers 14 that has been overlapped has a better buffer effect.

Figure 13:
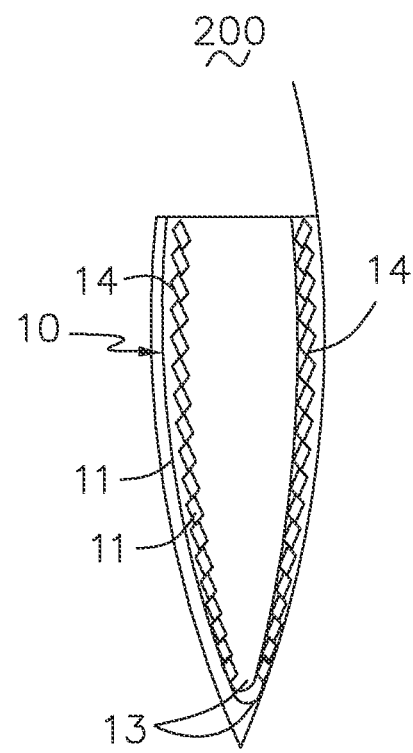
FIG. 13 is a schematic view of a cushion pad produced by the cushion unit of FIG. 12.
Figure 14:
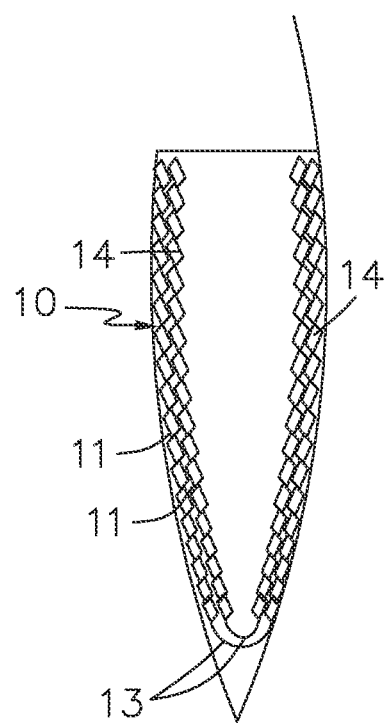
FIG. 14 is a side cross-sectional view of a packaging bag produced by the cushion unit of FIG. 12.

Referring to FIG. 13 and FIG. 14, the packaging bag 200 manufactured by using the cushion unit 10 with the plurality of third surfaces 11, has the better buffering effect relative to the packaging bag 200 manufactured by using the cushion unit 10 with only one third surface 11.

In an optical embodiment of the present disclosure, the cushion unit 10 includes the plurality of third surfaces 11, and the transferring regions 13 of two adjacent layers of the third surfaces 11 are arranged in a staggered manner or not completely overlapped with each other. At this time, after two layers of die-cutting regions 12 are unfolded, at least one layer of buffer layer 14 is opposite to the other layer of the transferring region 13, because the transferring region 13 is made of a paper material that is not subjected to be die-cut, the transferring region 13 can be served as a supporting surface for the other layer of the buffer layer 14, the buffer layer 14 acts on the supporting surface when the buffer layer 14 is subjected to a force, and the supporting surface is reacted to make the buffer layer 14 have a better recovery force, so that the better buffering effect can be obtained.

The above embodiment of the present disclosure does not need the die-cutting region 12 to be stretched into the three-dimensional network structure when manufacturing the cushion unit 10, which can save transportation costs. In addition, when the packing unit 10 is manufactured into the packaging bag 200, the cushion unit 10 does not need to be fixed inside the packaging bag 200 in a shape of the three-dimensional network structure, which only needs to directly connect or attach plane paper materials; in this way, it not only saves the transportation costs, but also has a relatively simple production process.

Figure 15:
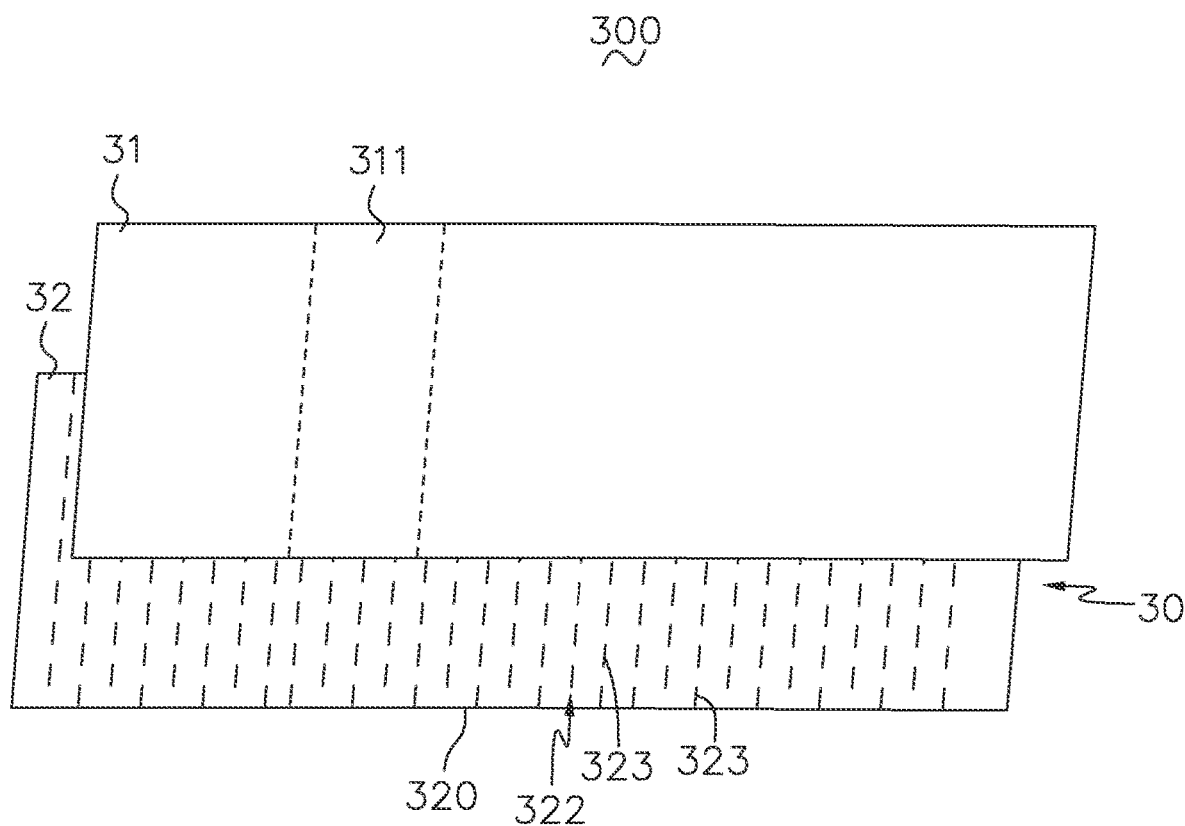
FIG. 15 is a schematic view of a cushion unit in accordance with a fourth embodiment of the present disclosure.

Referring to FIG. 15, the present disclosure further provides another cushion pad 300 made of a paper material and including a cushion unit 30. The cushion unit 30 includes a first surface 31 and a second surface 32. The first surface 31 includes an extension region 311 that can be unfolded along a length direction of the first surface 31. A length of the first surface 31 is increased after the extension region 311 is unfolded. Two ends of the second surface 32 along a length direction of the second surface 32 are respectively fixed at two ends of the first surface 31, a die-cutting region 320 arranged on the second surface 32, and a length of the die-cutting region 320 increased along with the extension region 311 when the extension region 311 is unfolded; the die-cutting region 320 is unfolded to form a buffer layer that causes the second surface 32 to expand in a thickness direction of the second surface 32 to play a buffering and protective role thereof; a three-dimensional network structure is formed after the die-cutting region 320 is unfolded.

The die-cutting region 320 includes a plurality of cutting lines 322 arranged by rows, each of the plurality of cutting lines 322 including a plurality of cutting slits 323 distributed at intervals, and the plurality of cutting slits 323 of two adjacent cutting lines 322 arranged in a staggered manner; a length and a cutting interval of the cutting slit 323 of each of the plurality of cutting lines 322 are the same. The cutting line 322 and the cutting slit 323 can form a hexagonal three-dimensional opening when the die-cutting region 320 is stretched, so that the die-cutting region 320 can form the buffer layer to play a buffering and protective role thereof.

In the present embodiment, the extension region 311 is a region that can be stretched, a length that the extension region 311 is unfolded is the same as a length that the die-cutting region 320 of the second surface 32 is stretched, and the die-cutting region 320 that has been unfolded also forms the buffer layer with the three-dimensional network structure, to play a buffering role thereof. Such cushion unit 30 can also be wrapped around the outside of the object to protect the object.

Figure 16:
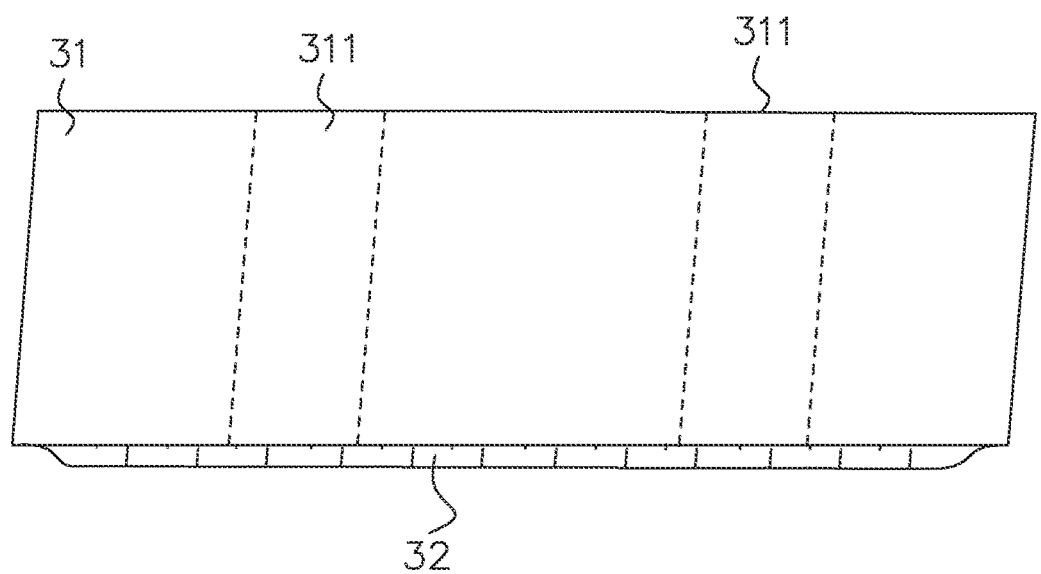
FIG. 16 is a schematic view of a cushion unit in accordance with a fifth embodiment of the present disclosure.

Referring to FIG. 16, in another embodiment of the present disclosure, there are two extension regions 311 respectively close to two ends of the first surface 31. At this time, when the first surface 31 is stretched by an external force, the two extension regions 311 are synchronously unfolded along with the second surface 32, compared with the embodiment with only one extension region 311, a smoother stretching mode can be obtained, and the length that the extension region 311 is stretched can be longer, which can satisfy a larger stretching rate of the second surface 32.

Figure 17:
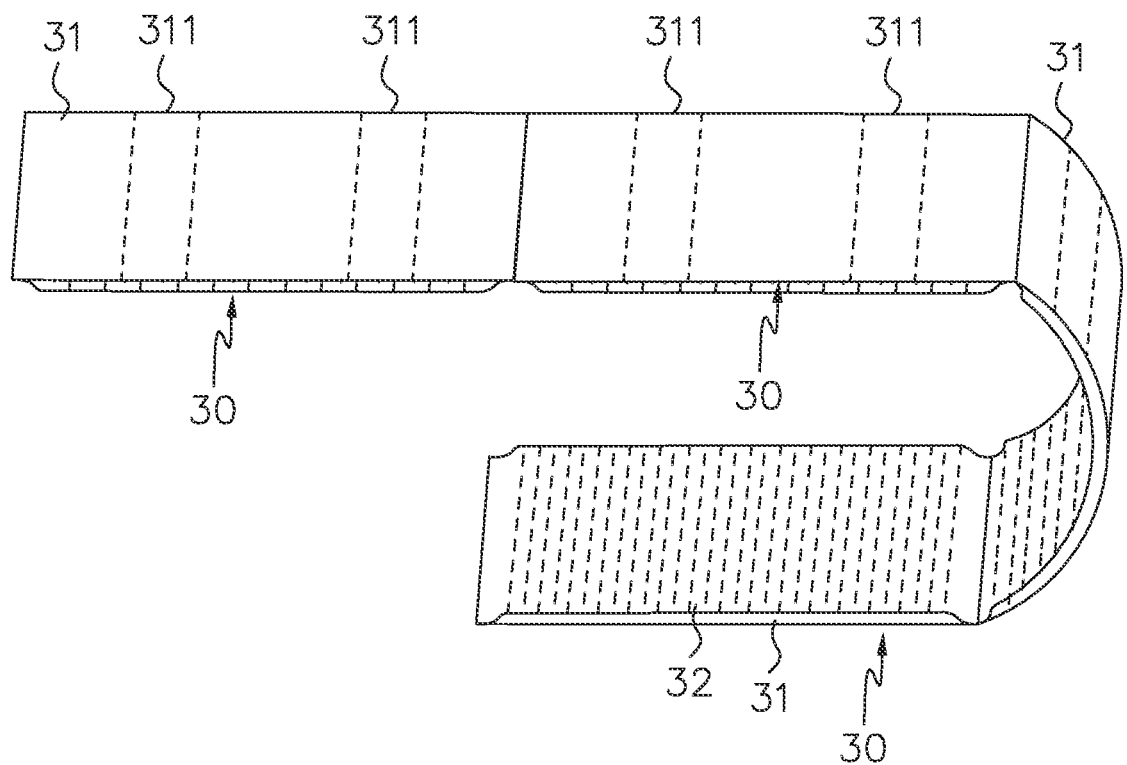
FIG. 17 is a schematic view of a cushion pad produced by the cushion unit of FIG. 16.

Referring to FIG. 17, the cushion pad 300 can include a plurality of cushion units 30 connected end to end. The first surface 31 and the second surface 32 are fixed to each other at ends of the plurality of cushion units 30. The cushion pad 300 connected by the plurality of cushion units 30 is in a strip-shaped structure, which is beneficial for stretching the strip to form the buffer layer 14, and on the other hand, when the cushion pad 300 is wrapped around an outer side of the object, the plurality of cushion units 30 can be wrapped with a plurality of layers around the outer side of the object, so that the buffering effect can be enhanced.

Figure 18:
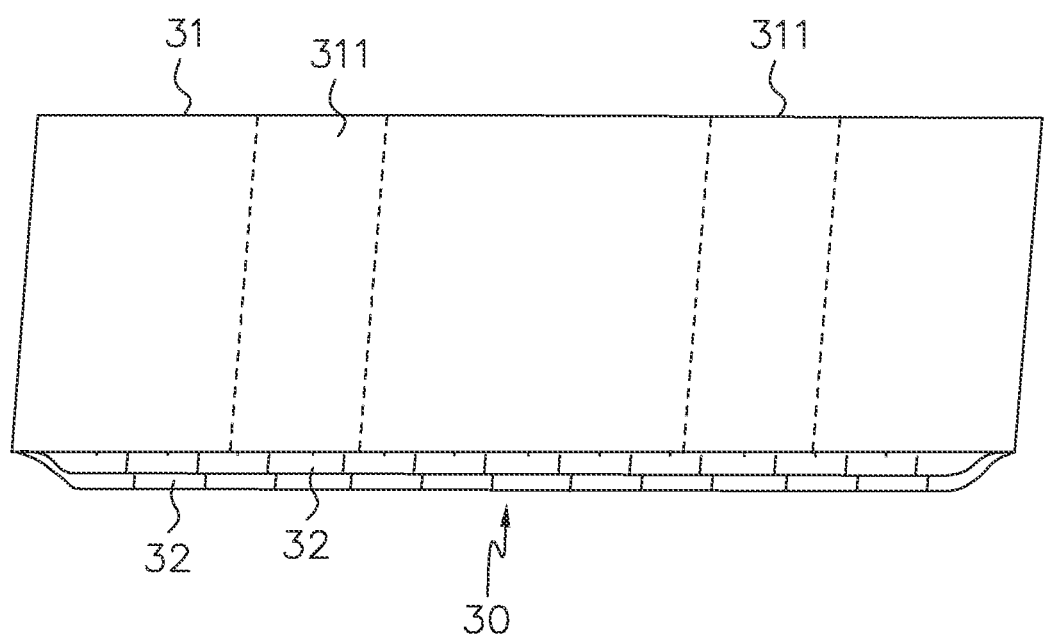
FIG. 18 is a schematic view of a cushion unit in accordance with a sixth embodiment of the present disclosure.

Referring to FIG. 18, in the present embodiment of the present disclosure, the cushion unit 30 can include a plurality of second surfaces 32 connected to each other at two ends of the first surface 31, and the plurality of second surfaces 32 form a multi-layer buffer layer when the plurality of second surfaces 32 is stretched, which can obtain a better buffering effect thereof. It is preferable that the plurality of cutting lines 322 of the plurality of second surfaces 32 is arranged in a staggered manner, in this way, after the plurality of second surfaces 32 is stretched, the three-dimensional network structures that have been formed are also arranged in the staggered manner, and at this time, the plurality of buffer layers act on or mesh with each other, so that a greater supporting force can be provided to ensure the better buffering effect.

Figure 19:
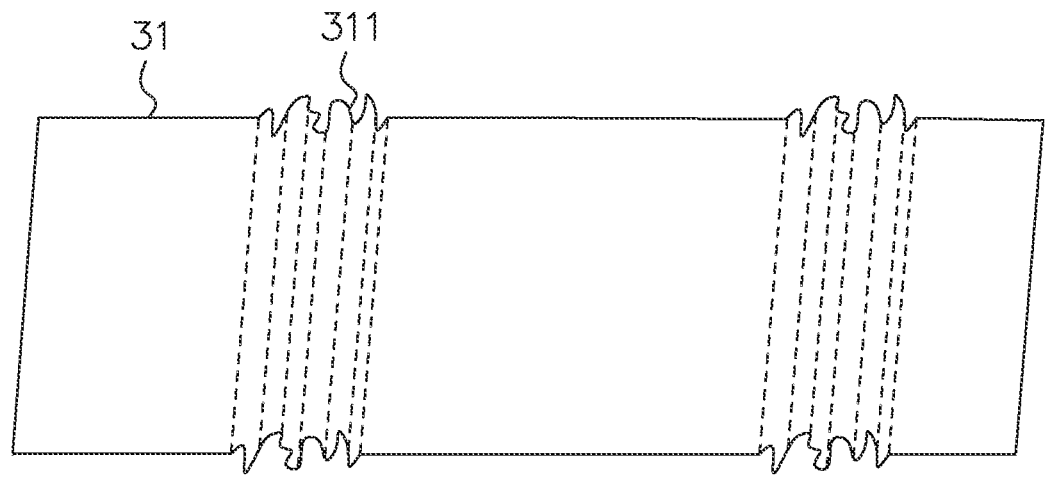
FIG. 19 is a schematic view of a first surface of the cushion unit in accordance with an embodiment of the present disclosure.
Figure 20:
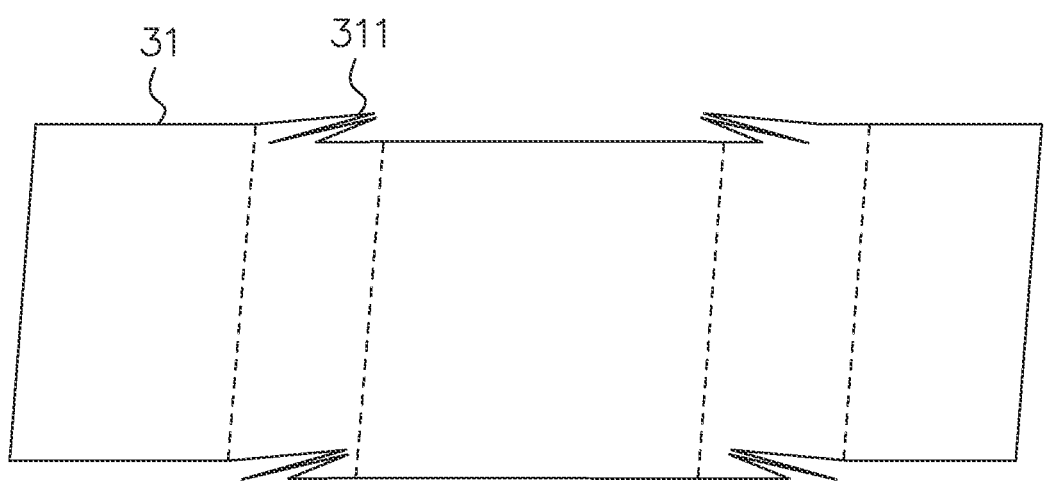
FIG. 20 is a schematic view of a first surface of the cushion unit in accordance with another embodiment of the present disclosure.

Referring to FIG. 19 and FIG. 20, the extension region 311 is formed by pleating or folding the first surface 31 along a width direction of the first surface 31, and an increased length that the extension region 311 is unfolded is the same as increased lengths of the first surface 31 and the second surface 32.

A production method of pleating and folding is relatively simple, which can reduce a production process of the first surface 31, thereby ensuring a production efficiency of the cushion unit 30 and reducing costs thereof. Referring to FIG. 21 to FIG. 24, the present disclosure also provides a packaging bag 400 manufactured by the cushion unit 30 according to the present embodiment. Specifically, the packaging bag 400 includes an outer bag body 40 and a cushion unit 30. The cushion unit 30 is arranged on the outer bag body 40 along a length direction of the cushion unit 30, two sides of the cushion unit 30 along a width direction of the cushion unit 30 unconnected to the outer bag body 40. When the object is put into to the packaging bag 400, a direction that the object is put into the packaging bag 400 is consistent with the length direction of the cushion unit 30; the cushion unit 30 is unfolded along the direction that the object is put into the packaging bag 400, and expanded in a thickness direction of the cushion unit 30, to play a buffering and protective role thereof.

A width of the cushion unit 30 is smaller than a width of the packaging bag 400; after the cushion unit 30 is unfolded, the two sides of the cushion unit 30 along the width direction of the cushion unit 30 are abutted against two inner sides of the outer bag body 40, respectively, so that a confined space is formed between the outer bag body 40 and the cushion unit 30.

Two ends of the cushion unit 30 along the length direction of the cushion unit 30 are respectively arranged near an inner wall of an opening of the outer bag body 40, and a center position of the cushion unit 30 is suspended in the outer bag body 40; after the cushion unit 30 is unfolded along the direction that the object is put into the packaging bag 400, the center position of the cushion unit 30 moves to a bottom portion of the outer bag body 40.

When the object is put into the packaging bag 400, a direction that the object is put into the packaging bag 400 is consistent with the length direction of the cushion unit 30, the die-cutting region 320 of the second surface 32 is unfolded along the direction that the object is put into the packaging bag 400, two buffer layers 321 are formed on two side surfaces of the packaging bag 400, and expanded in the thickness direction of the cushion unit 30, thereby playing a buffering and protective role thereof. Such configuration can overcome a destructive force from any direction of the two side surfaces of the packaging bag 400.

Figure 21:
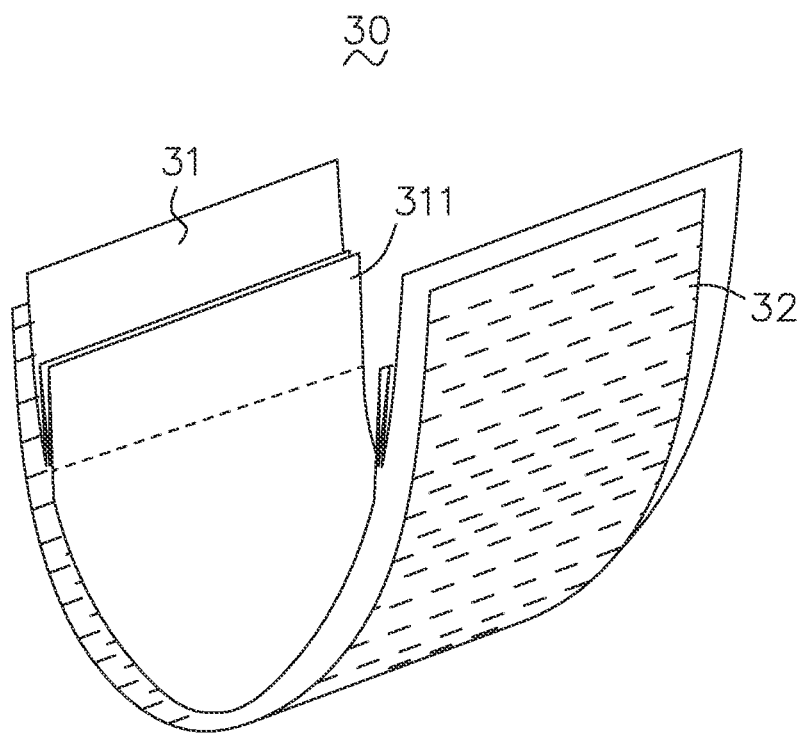
FIG. 21 is a schematic view of the cushion unit of FIG. 16.
Figure 22:
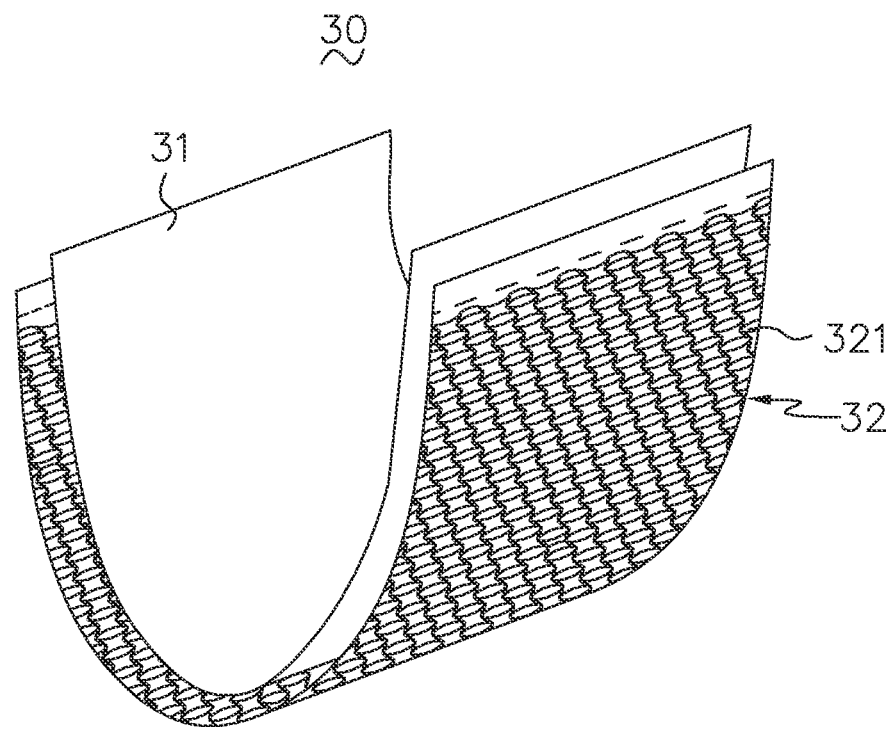
FIG. 22 is a schematic view of the cushion unit of FIG. 21, shown the cushion unit is unfolded.

When the cushion unit 30 is not unfolded, a shape of the cushion unit 30 inside the packaging bag 400 is as shown in FIG. 21. When the cushion unit 30 inside the packaging bag 400 is unfolded, a structure of the cushion unit 30 inside the packaging bag 400 is as shown in FIG. 22. As can be seen from the FIG. 21 and FIG. 22, when the second surface 32 is unfolded, the extension region 311 of the first surface 31 is also unfolded synchronously to form a smoother inner wall structure, which is convenient for the object to be placed.

Figure 23:
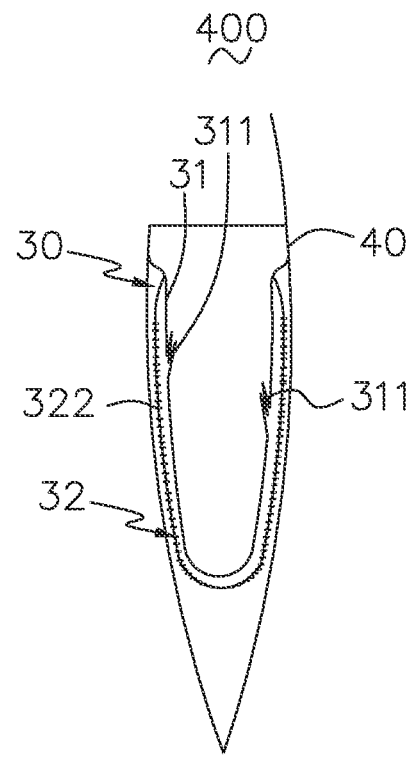
FIG. 23 is a side cross-sectional view of the packaging bag of FIG. 21, shown the cushion unit is not unfolded.
Figure 24:
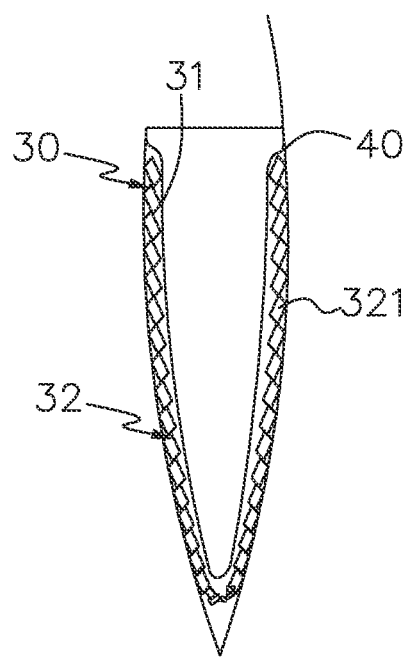
FIG. 24 is similar to FIG. 23, but shown the cushion unit unfolded.

Referring to FIG. 23 and FIG. 24, it is preferable that a distance between one of the two extension regions 311 and one end of the first surface 31 is different from a distance between the other of the two extension regions 311 and the other end of the first surface 31. At this time, when the first surface 31 is unfolded, the two extension regions 311 are misaligned with each other, so that the two extension regions 311 do not interfere with each other when the two extension regions 311 are unfolded in a narrow space inside the packaging bag 400, which can not only reduce a resistance when the two extension regions 311 are unfolded to more conveniently put the object into the packaging bag 400, but also ensure an effectiveness that the two extension regions 311 are unfolded.

The lengths that the two extension regions 311 are unfolded are the same, and when the object is put into packaging bag 400, the same lengths that the two extension regions 311 are unfolded can ensure that positions where the object is in contact with the first surface 31 are not shifted, and it is more smooth and easy to put the object into the packaging bag 400, which can overcome difficulties that the object is put into the packaging bag 400 due to a friction between the object and the first surface 31, or need a greater thrust to unfold the second surface 32, but the greater thrust can cause damage to the first surface 31.

It is further preferable that the extension region 311 is formed by folding the first surface 31 along the width direction of the first surface 31; widths that the two extension regions 311 are folded are small, so that the extension regions 311 can be conveniently unfolded in the narrow space of the packaging bag 400.

A small width that each of the two extension regions 311 is folded can ensure that the two extension regions 311 can be conveniently unfolded more smoother and a lower thrust is needed in the narrow space.

Figure 25:
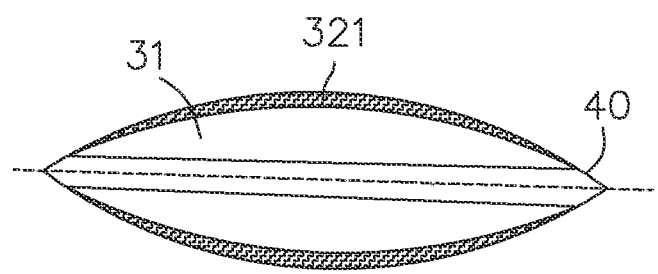
FIG. 25 is a top cross-sectional view of the packaging bag of FIG. 21, shown the packaging bag unfolded.
Figure 26:
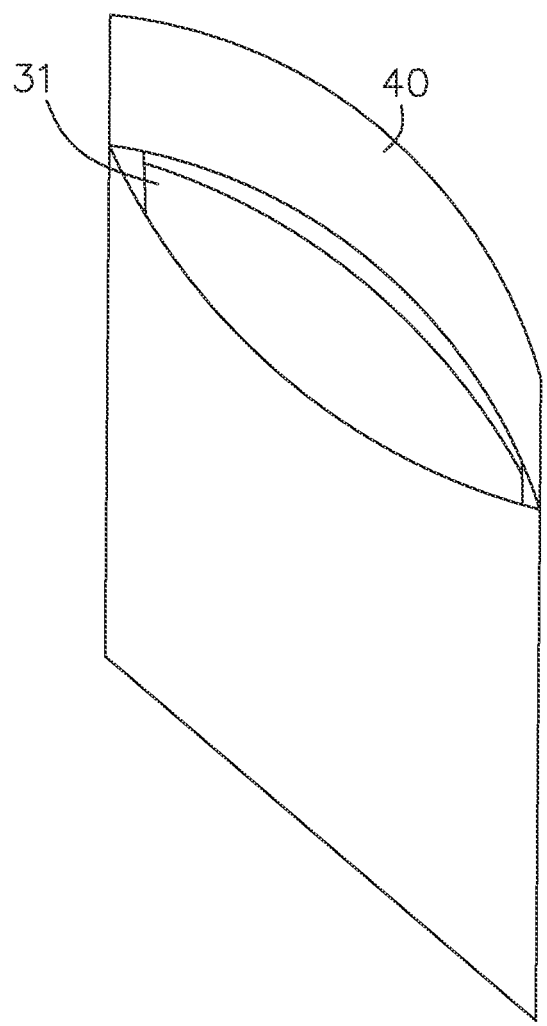
FIG. 26 is a schematic view of the packaging bag produced by the cushion unit of FIG. 21.

Referring to FIG. 25 and FIG. 26, in a preferred embodiment, the width of the second surface 32 is slightly smaller than the width of the first surface 31, it can be seen from the FIG. 25 and FIG. 26 that, when the second surface 32 is completely unfolded, the second surface 32 acts on the outer bag body 40 and the first surface 31, so that the outer bag body 40 and the first surface 31 are in contact with each other near a side that the object is put into the packaging bag 400, that is, the two sides of the first surface 31 along the length direction of the first surface 31 abut against corresponding inner walls of the outer bag body 40, and the two ends of the second surface 32 along the length direction of the second surface 32 are connected close to the opening of the outer bag body 40, so that the second surface 32 is arranged in a space enclosed by the first surface 31 and the outer bag body 40. On one hand, the second surface 32 itself has the buffer layer 321 to play a buffering role thereof, and on the other hand, a cavity with air is formed within the second surface 32, in this way, when an external force is applied to the outer bag body 40, the air in the cavity can also play a buffering role to further enhance the buffering role thereof.

Figure 27:
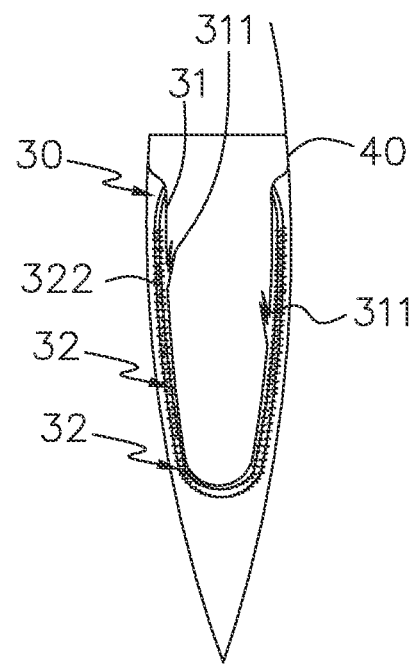
FIG. 27 is a schematic view of the packaging bag produced by another cushion unit, shown the packaging bag is not unfolded.
Figure 28:
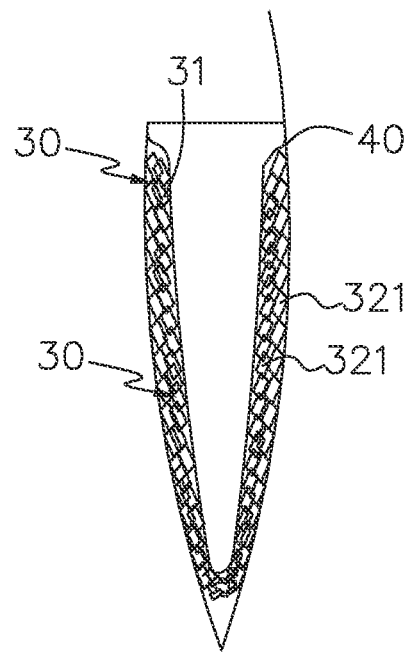
FIG. 28 is similar to FIG. 27, but shown the packaging bag unfolded.

Referring to FIG. 27 and FIG. 28, in an embodiment of the present disclosure, the cushion unit 30 includes two layers of second surfaces 32 connected to each other at ends of the cushion unit 30, and when the cushion unit 30 is manufactured into the packaging bag 400, a two-layer of buffer layer 321 is formed on each side surface of the packaging bag 400, so that the buffering effect of the packaging bag 400 can be improved.

Figure 29:
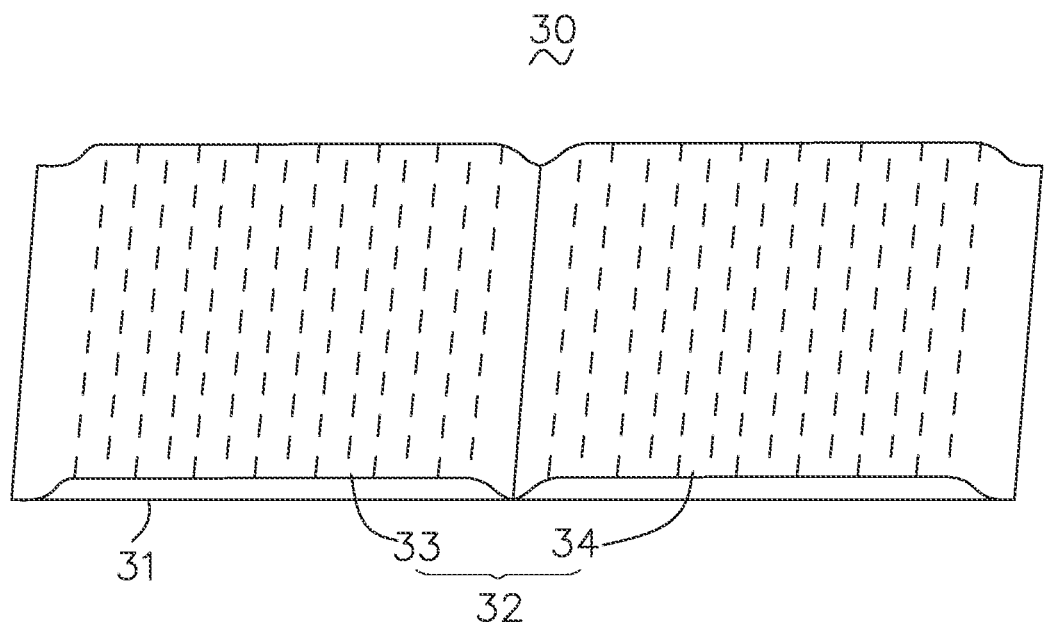
FIG. 29 and FIG. 30 are schematic views of another cushion unit of the present disclosure.
Figure 30:
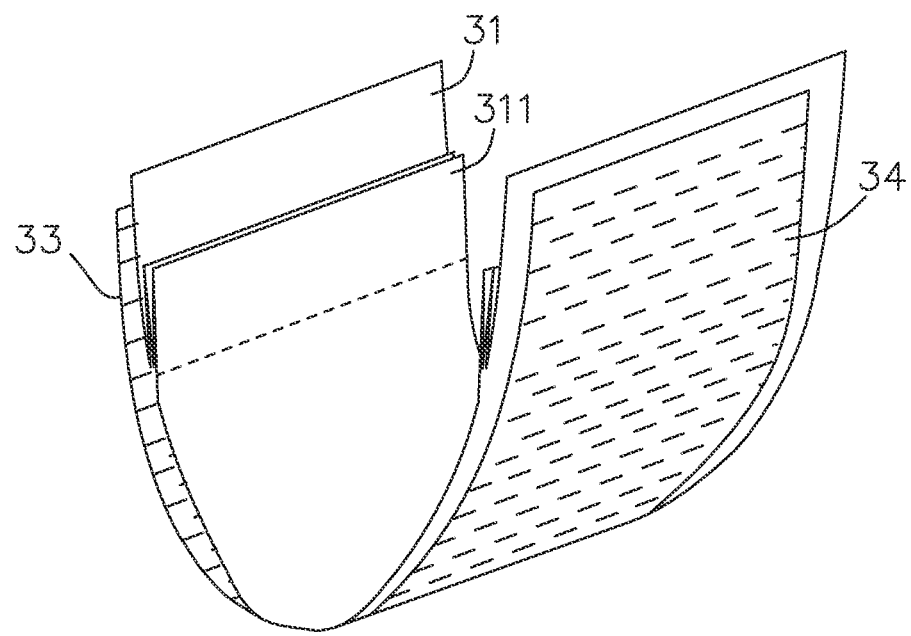

Referring to FIG. 29 and FIG. 30, the cushion unit 30 of the present disclosure also has another embodiment.

The second surface 32 includes a first sub-surface 33 and a second sub-surface 34, both the first sub-surface 33 and the second sub-surface 34 are die-cutting regions 320, and both the first sub-surface 33 and the second sub-surface 34 cooperative form the second surface 32. One end of the first sub-surface 33 is connected to one end of the first surface 31, and the other end of the first sub-surface 33 is connected to a central line of the first surface 31 along the length direction of the first surface 31; one end of the second sub-surface 34 connected to the other end of the first surface 31, and the other end of the second sub-surface 34 connected to the central line of the first surface 31 along the length direction of the first surface 31.

Figure 31:
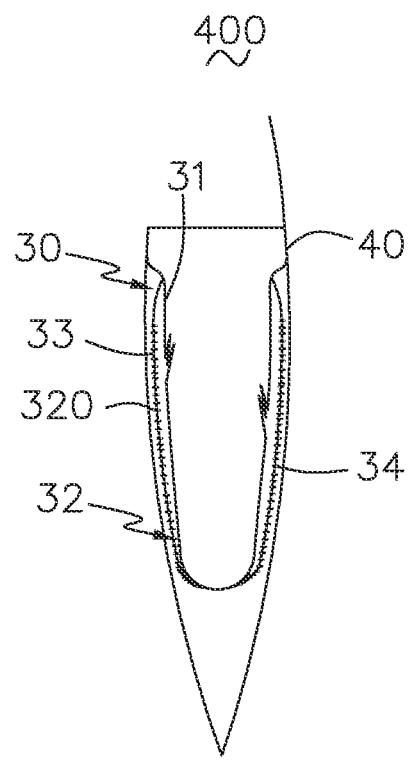
FIG. 31 is a side cross-sectional view of the packaging bag produced by the cushion unit of FIG. 29, shown the packaging bag is not unfolded.
Figure 32:
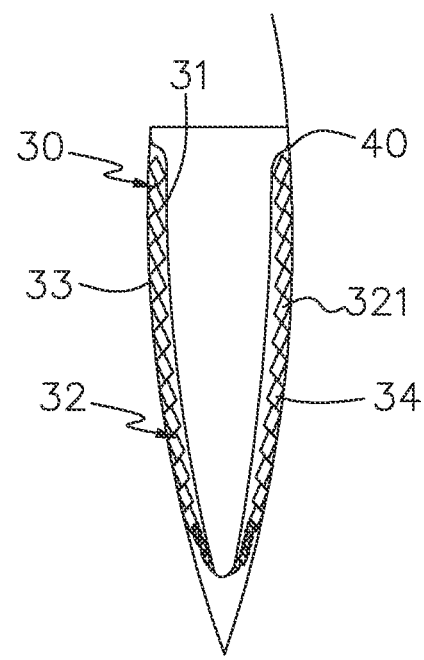
FIG. 32 is a side cross-sectional view of the packaging bag produced by the cushion unit of FIG. 31, shown the packaging bag unfolded.

Referring to FIG. 31 and FIG. 32, in the present embodiment, when the packaging bag 400 is manufactured by using the cushion unit 30, the cushion unit 30 is folded in half to ensure that the center line of the first surface 31 is aligned with the bottom portion of the outer bag body 40. After the packaging bag 400 is manufactured by using the cushion unit 30, a size of the packaging bag 400 is relatively thin, which can reduce transportation costs. When the object is placed in the packaging bag 400 or both the first sub-surface 33 and the second sub-surface 34 within the second surface 32 are pushed to be unfolded by an external force, both the first sub-surface 33 and the second sub-surface 34 expand in the thickness direction thereof to form the buffer layer 321. When the first sub-surface 33 and the second sub-surface 34 are expanded, the first sub-surface 33 is subjected to tensile forces from two ends of the first sub-surface 33 itself, which are respectively the tensile force from one end of the first surface 31, and the tensile force of the central line of the second surface 32, so that the first sub-surface 33 can be pulled to be unfolded more easily. Similarly, the second sub-surface 34 is also easier to be unfolded.

Figure 33:
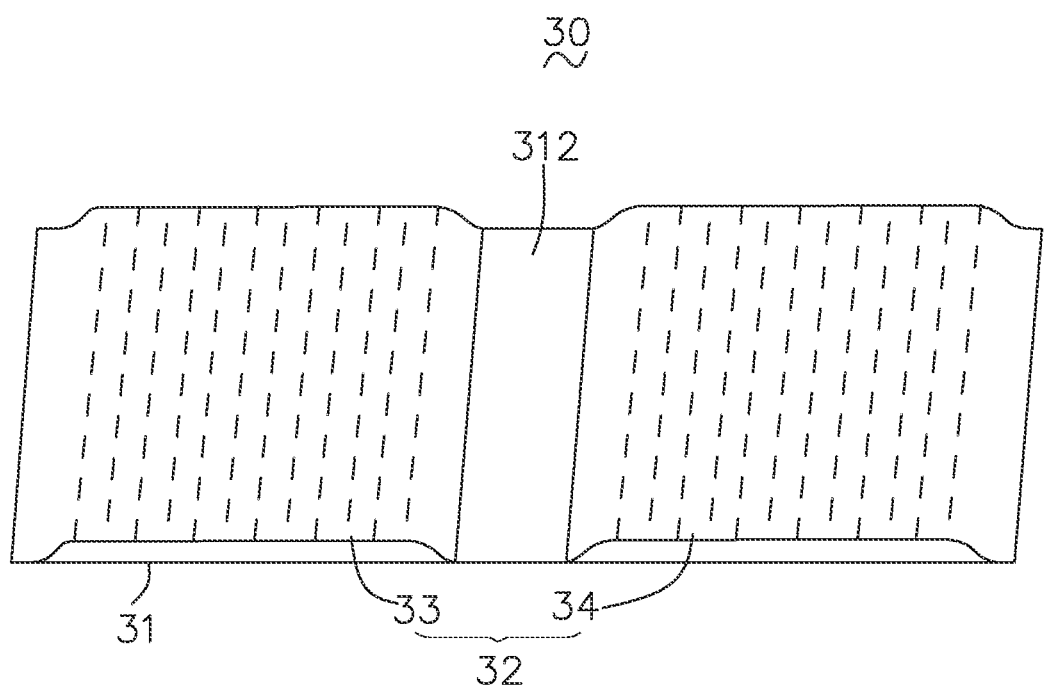
FIG. 33 and FIG. 34 are schematic views of another cushion unit of the present disclosure.
Figure 34:
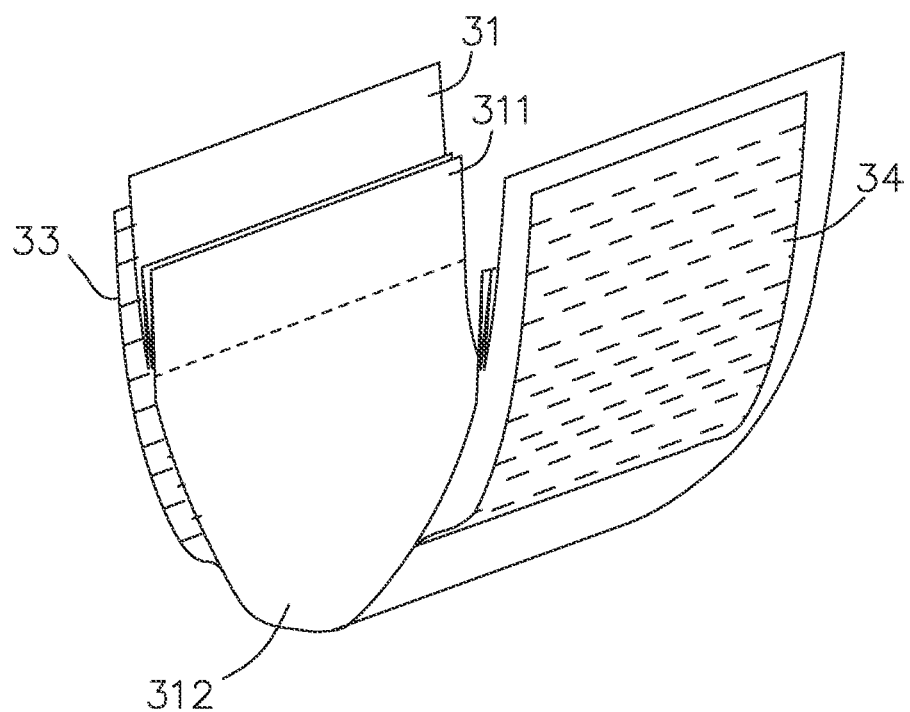

Referring to FIG. 33 and FIG. 34, the cushion unit 30 of the present disclosure also has another embodiment.

A transferring region 312 is arranged at a center of the first surface 31, and is a stripe-shaped region arranged along the width direction of the first surface 31. The second surface 32 includes a first sub-surface 33 and a second sub-surface 34, both the first sub-surface 33 and the second sub-surface 34 are die-cutting regions 320, and cooperative form the second surface 32. One end of the first sub-surface 33 is connected to one end of the first surface 31, and the other end of the first sub-surface 33 connected to one end of the transferring region 312; one end of the second sub-surface 34 connected to the other end of the first surface 31, and the other end of the second sub-surface 34 connected to the other end of the transferring region 312.

Figure 35:
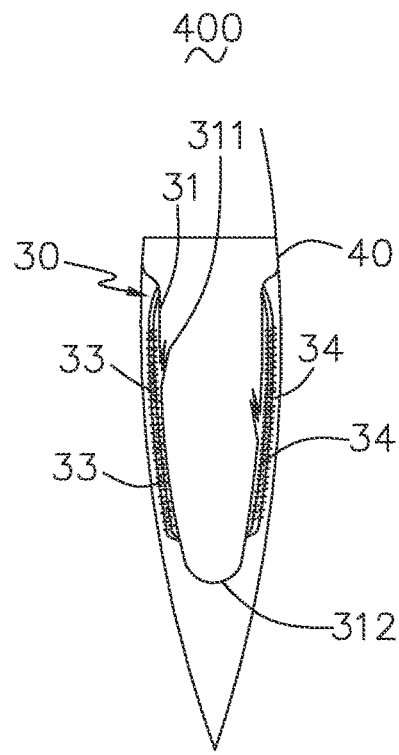
FIG. 35 is a side cross-sectional view of the packaging bag produced by the cushion unit of FIG. 33, shown the packaging bag is not unfolded.
Figure 36:
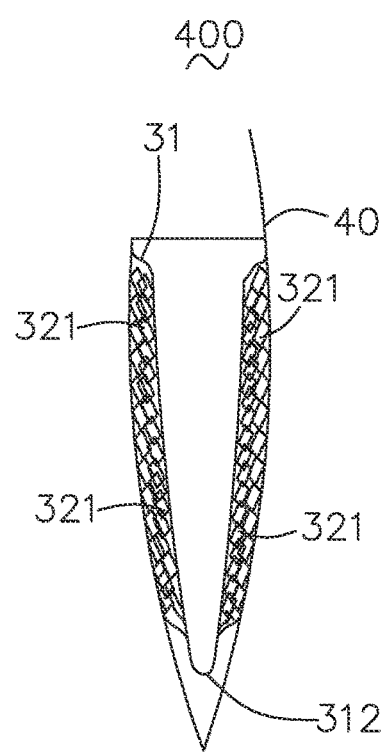
FIG. 36 is a side cross-sectional view of the packaging bag produced by the cushion unit of FIG. 35, shown the packaging bag unfolded.

Referring to FIG. 35 and FIG. 36, in the present disclosure, after the packaging bag 400 is manufactured by using the cushion unit 30, a size of the packaging bag 400 is relatively thin, which can reduce transportation costs. At the same time, when the object is put into the packaging bag 400, the object can directly abut against the transferring region 312, the transferring region 312 pushes the first surface 31 to be unfolded, and then the first surface 31 drives the first sub-surface 33 and the second sub-surface 34 to be unfolded. Particularly, at this time, the die-cutting region 320 is not arranged at a position corresponding to the transferring region 312 that has been unfolded, and the transferring region 312 can easily and directly abut against the bottom portion of the packaging bag 400, so that two side surfaces of the outer bag body 40 can fully cover by a buffer region that is formed by unfolding both the first sub-surface 33 and the second sub-surface 34, which can have a deeper insertion depth. At the same time, the first surface 31 is relatively easy to be unfolded because the thrust applied to the first surface 31 is relatively small during unfolding the first surface 31, and even both the first sub-surface 33 and the second sub-surface 34 can be unfolded only by the gravity of the object that is put into the packaging bag 400. Compared with a way that the second surface 32 is completely covered on the first surface 31, there is no friction generated between the transferring region 312 and the second surface 32 during the unfolding process, which can also ensure a smoother unfolding process thereof.

Figure 37:
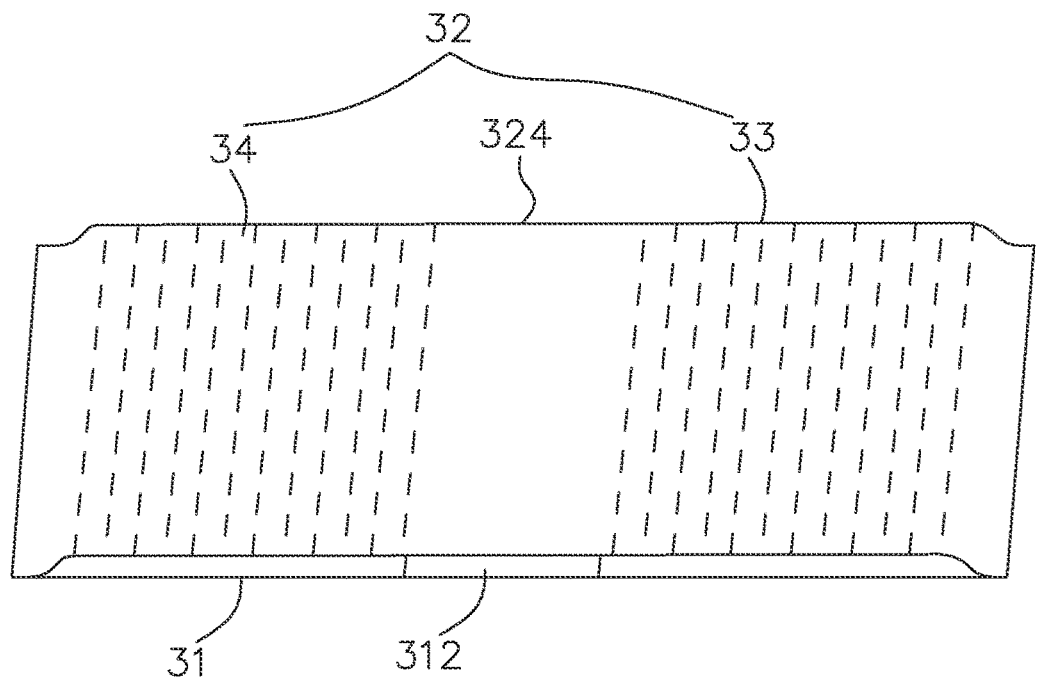
FIG. 37 and FIG. 38 are schematic views of another cushion unit of the present disclosure.
Figure 38:
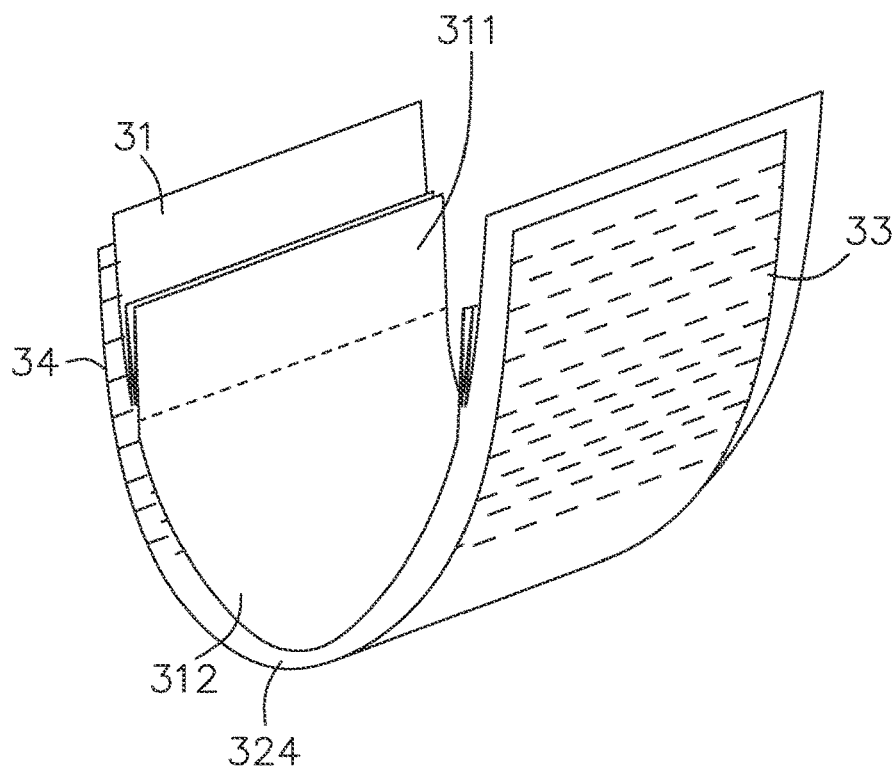

Referring to FIG. 37 and FIG. 38, the cushion unit 30 of the present disclosure also has another embodiment.

The first surface 31 includes a transferring region 312 and the second surface 32 includes a blank region 324, the transferring region 312 arranged at a center of the first surface 31, and the blank region 324 opposite to the transferring region 312. The transferring region 312 is a stripe-shaped region arranged along the width direction of the first surface 31. The second surface 32 includes a first sub-surface 33 and a second sub-surface 34 respectively arranged on two ends of the blank region 324. All the first sub-surface 33, the second sub-surface 34 and the blank region 324 cooperatively form the second surface 32; one end of the first sub-surface 33 far from the blank region 324 connected to one end of the first surface 31, and the other end of the second sub-surface 34 far from the blank region 324 connected to the other end of the first surface 31.

In the present embodiment, the second surface 32 is complete, both the first sub-surface 33 and the second sub-surface 34 are a part of the second surface 32, and the second surface 32 also only needs to connect two ends of the second surface 32 to two ends of the first surface 31, respectively, rather than needing to respectively cut off the first sub-surface 33 and the second sub-surface 34 for additionally fixing and pasting the first sub-surface 33 and the second sub-surface 34.

When the first sub-surface 33 and the second sub-surface 34 are unfolded, it only needs to push or pull the transferring region 312 or the blank region 324; there is no friction generated between the second surface 32 and the first surface 31 in the blank region 324, and the first sub-surface 33 and the second sub-surface 34 are unfolded more smoothly.

Figure 39:
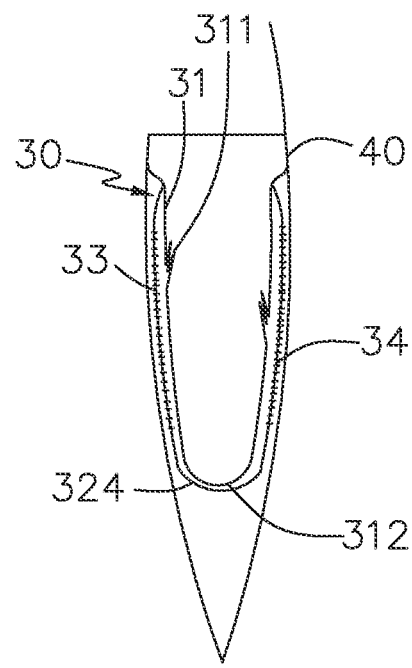
FIG. 39 is a side cross-sectional view of the packaging bag produced by the cushion unit of FIG. 36, shown the packaging bag is not unfolded.
Figure 40:
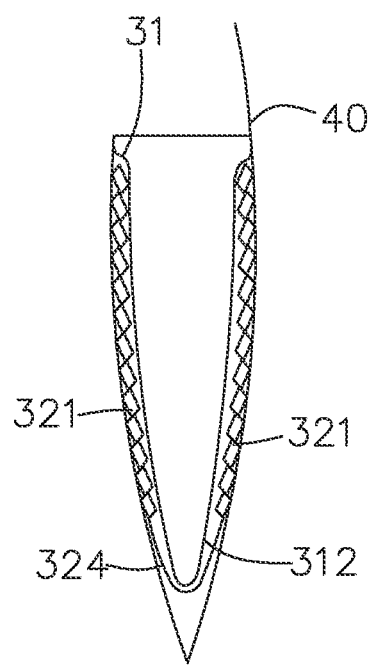
FIG. 40 is a side cross-sectional view of the packaging bag produced by the cushion unit of FIG. 37, shown the packaging bag unfolded.

Referring to FIG. 39 and FIG. 40, in the present embodiment of the present disclosure, the cushion unit 30 is used to manufacture the packaging bag 400; after the cushion unit 30 is fixed to the packaging bag 400, the buffer layer 321 can be completely formed on two side surfaces of the outer bag body 40, and both the blank region 324 and the transferring region 312 can abut against the bottom portion of the packaging bag 400, so that a deeper insertion depth is obtained.

Figure 41:
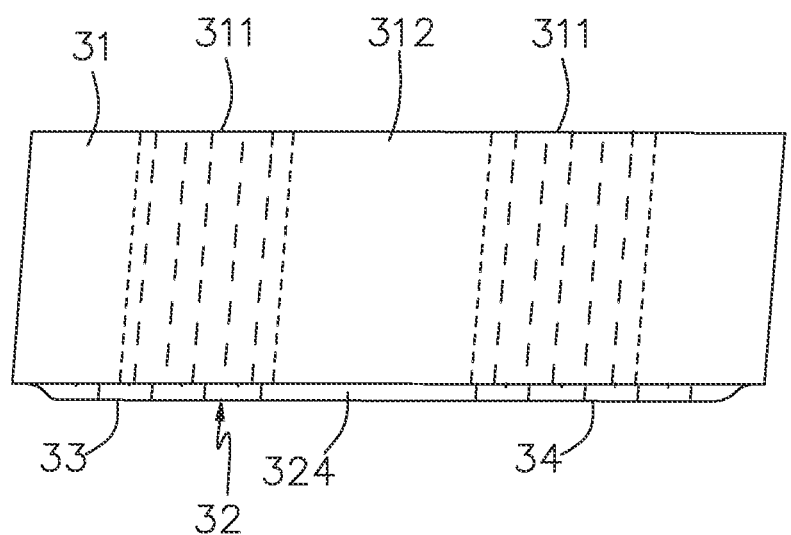
FIG. 41 is a schematic view of another cushion unit of the present disclosure.
Figure 42:
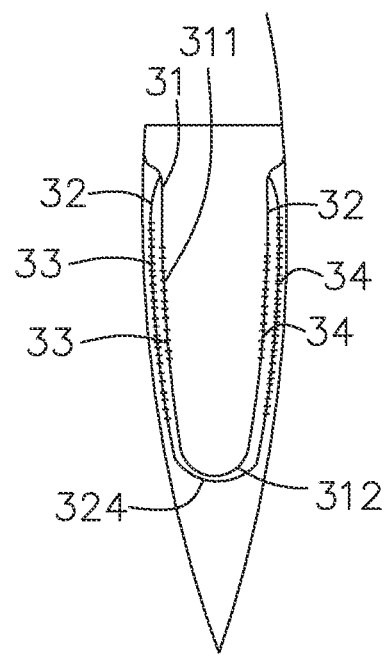
FIG. 42 is a side cross-sectional view of the packaging bag produced by the cushion unit of FIG. 41, shown the packaging bag is not unfolded.

Referring to FIG. 41 and FIG. 42, the cushion unit 30 of the present disclosure also has another embodiment.

The extension region 311 of the first surface 31 can also be the die-cutting region 320. The first surface 31 includes the transferring region 312, and there are two extension regions 311. Two ends of the two extension regions 311 are respectively connected to ends of the first surface 31 along the length direction of the first surface 31, and the blank region 324. The transferring region 312 is arranged in the center of the first surface 31, and the transferring region 312 is a strip-shaped region arranged along the width direction of the first surface 31.

At this time, the transferring region 312 can be pushed or pulled under an action of an external force, so that the extension region 311 is unfolded to form the buffer layer 321. At the same time, the second surface 32 is also unfolded to form the buffer layer 321, in this way, the cushion unit 30 has two layers of buffer layers 321.

Figure 43:
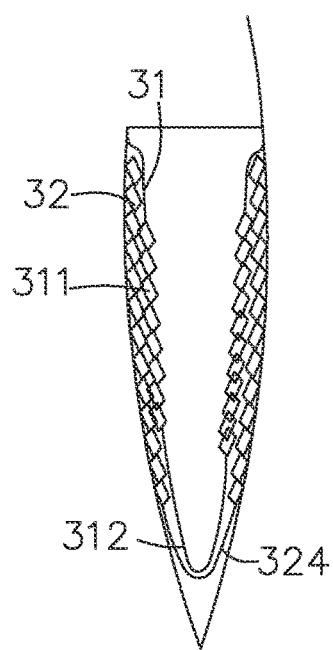
FIG. 43 is a side cross-sectional view of the packaging bag produced by the cushion unit of FIG. 42, shown the packaging bag unfolded.

Referring to FIG. 43, the packaging bag 400 is manufactured by using the cushion unit 30 of the present embodiment; after the object is put into the packaging bag 400, the extension region 311 of the first surface 31 is unfolded and the die-cutting region 320 of the second surface 32 is also unfolded to form a double-layer structure thereof. When the cushion unit 30 is manufactured, both the first surface 31 and the second surface 32 can be cut in a die-cutting step, rather than needing additional pasting, wrinkling and folding steps, therefore, the manufacturing process is simple and the cost is reduced.

Figure 44:
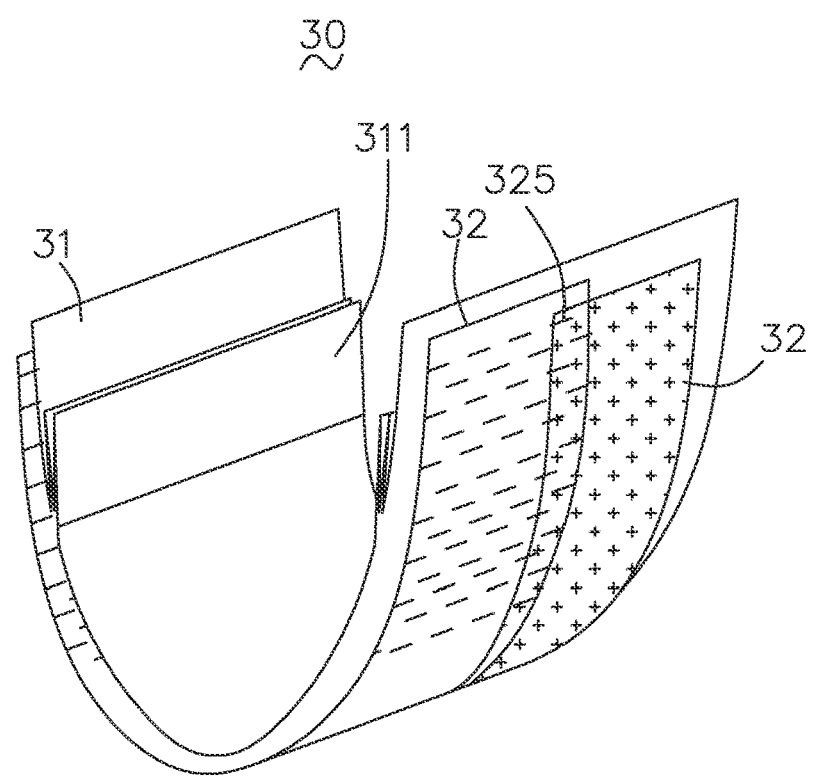
FIG. 44 is a schematic view of another cushion unit of the present disclosure.

Referring to FIG. 44, the cushion unit 30 of the present disclosure also has another embodiment.

In the present embodiment, there is a plurality of second surfaces 32 arranged along a width direction of the first surface 31, edges of two adjacent second surfaces 32 overlapped with each other.

At this time, when the plurality of second surfaces 32 is stretched to form the buffer layer, a plurality of die-cutting regions 325 that are adjacent and overlapped in the plurality of second surfaces 32 is to form two three-dimensional network structures, with the two three-dimensional network structures overlapping and interlacing with each other, thereby resulting in a better buffering effect thereof. In addition, during stretching the plurality of die-cutting regions 325 to form the buffer layer, as a length of each of the plurality of die-cutting regions 325 increases, a width of the buffer layer correspondingly decreases; in this way, a width of the middle of the buffer layer along a length direction of the buffer layer is smaller than a width of two ends of the buffer layer can be occurred, so that a bare region is formed at the center of the buffer layer along the length direction of the buffer layer. When the plurality of second surfaces 32 that is arranged in a staggered manner is provided in the present embodiment, an area of the bare region of the first surface 31 that has not been covered by the buffer layer can be appropriately reduced, so as to provide the better protection effect.

The packaging bag 400 is manufactured by using the cushion unit 30 of the present embodiment; after the object is put into the packaging bag 400, the extension region 311 of the first surface 31 is unfolded and the die-cutting region 325 of the second surface 32 is also unfolded to form a double-layer structure in an overlapping area of the plurality of second surfaces 32. In addition, when the plurality of second surfaces 32 is unfolded, a small bare region that is uncovered is formed in the middle of the buffer layer along the length direction of the buffer layer, which further improves the buffer protection performance compared to a structure with only one second surface 32.

Finally, it should be noted that the above embodiments are only a description of the present disclosure and the foregoing description is not in any form a limitation to the present disclosure. Any variation or replacement produced by one of ordinary skill in the art without departing from the spirit of the present disclosure shall fall within the protection scope of the present disclosure.

What is claimed is:

1. A cushion pad made of a paper material, and comprising at least one cushion unit, each of the at least one cushion unit comprising:
   a first surface, and two extension regions respectively adjacent to two ends of the first surface and unfolded along a length direction of the first surface to increase a length of the first surface;
   at least one layer of second surface, two ends of the second surface along a length direction of the second surface respectively fixed at two ends of the first surface, a die-cutting region arranged on the second surface, and a length of the die-cutting region increased along with the extension region when the extension region is unfolded; and wherein the die-cutting region is unfolded to form a buffer layer that causes the second surface to expand along a thickness direction of the second surface to play a buffering and protective role thereof; and wherein
   a three-dimensional network structure is formed after the die-cutting region is unfolded; and wherein
   the at least one cushion unit comprises a plurality of cushion units connected end to end, and the first surface and the second surface are fixed to each other at ends of the plurality of cushion units; and wherein
   the die-cutting region comprises a plurality of cutting lines arranged by rows, each of the plurality of cutting lines comprising a plurality of cutting slits distributed at intervals, and the plurality of cutting slits of two adjacent cutting lines arranged in a staggered manner; and wherein a length and a cutting interval of the cutting slit of each of the plurality of cutting lines are the same; and wherein
   the extension region is formed by pleating or folding the first surface along a width direction of the first surface, and an increased length of the extension region that is unfolded is the same as increased lengths of the first surface and the second surface; and wherein
   a distance between one of the two extension regions and one of the two ends of the first surface is different from a distance between the other of the two extension regions and the other of the two ends of the first surface.

2. The cushion pad as claimed in claim 1, wherein two ends of the extension region are connected to the first surface, respectively.

3. The cushion pad as claimed in claim 2, wherein the die-cutting region comprises a plurality of cutting lines arranged by rows, each of the plurality of cutting lines comprising a plurality of cutting slits distributed at intervals, and the plurality of cutting slits of two adjacent cutting lines arranged in a staggered manner; and wherein a length and a cutting interval of the cutting slit of each of the plurality of cutting lines are the same.

4. The cushion pad as claimed in claim 1, wherein the die-cutting region comprises a plurality of cutting lines arranged by rows, each of the plurality of cutting lines comprising a plurality of cutting slits distributed at intervals, and the plurality of cutting slits of two adjacent cutting lines arranged in a staggered manner; and wherein a length and a cutting interval of the cutting slit of each of the plurality of cutting lines are the same.

5. The cushion pad as claimed in claim 1, wherein the extension region is formed by folding the first surface along the width direction of the first surface; a folding width of each of the two extension regions is small, so that the two extension regions can be conveniently unfolded in a narrow space thereof, the second surface is provided with two layers, and two ends of the two layers of second surfaces are respectively connected to the two ends of the first surface.

6. The cushion pad as claimed in claim 1, wherein the second surface comprises a first sub-surface and a second sub-surface, and both the first sub-surface and the second sub-surface are die-cutting regions; both the first sub-surface and the second sub-surface cooperatively forming the second surface, one end of the first sub-surface connected to one end of the first surface, and the other end of the first sub-surface connected to a central line of the first surface along the length direction of the first surface; the second sub-surface connected to the other end of the first surface, and the other end of the second sub-surface connected to the central line of the first surface along the length direction of the first surface.

7. The cushion pad as claimed in claim 6, wherein a transferring region is arranged at a center of the first surface, and is a stripe-shaped region arranged along the width direction of the first surface; the other end of the first sub-surface connected to one end of the transferring region; one end of the second sub-surface connected to the other end of the first surface, and the other end of the second sub-surface connected to the other end of the transferring region.

8. The cushion pad as claimed in claim 1, wherein the second surface comprises a first sub-surface and a second sub-surface, and both the first sub-surface and the second sub-surface are die-cutting regions; both the first sub-surface and the second sub-surface cooperatively forming the second surface, one end of the first sub-surface connected to one end of the first surface, and the other end of the first sub-surface connected to a central line of the first surface along the length direction of the first surface; the second sub-surface connected to the other end of the first surface, and the other end of the second sub-surface connected to the central line of the first surface along the length direction of the first surface.

9. The cushion pad as claimed in claim 1, wherein the first surface comprises a transferring region and the second surface comprises a blank region, the transferring region arranged at a center of the first surface, and the blank region opposite to the transferring region; the transferring region being a stripe-shaped region arranged along the width direction of the first surface; the second surface comprising a first sub-surface and a second sub-surface respectively arranged on two ends of the blank region; all the first sub-surface, the second sub-surface and the blank region cooperatively forming the second surface; one end of the first sub-surface far from the blank region connected to one end of the first surface, and the other end of the second sub-surface far from the blank region connected to the other end of the first surface.

10. The cushion pad as claimed in claim 1, wherein the first surface comprises a transferring region and the second surface comprises a blank region, the transferring region arranged at a center of the first surface, and the blank region opposite to the transferring region; the transferring region being a stripe-shaped region arranged along the width direction of the first surface; the second surface comprising a first sub-surface and a second sub-surface respectively arranged on two ends of the blank region; all the first sub-surface, the second sub-surface and the blank region cooperatively forming the second surface; one end of the first sub-surface far from the blank region connected to one end of the first surface, and the other end of the second sub-surface far from the blank region connected to the other end of the first surface.

11. The cushion pad as claimed in claim 1, wherein the at least one layer of second surface comprises a plurality of second surfaces arranged along a width direction of the first surface, edges of two adjacent second surfaces overlapped with each other.

12. A cushion pad made of a paper material and comprising at least one cushion unit, each of the at least one cushion unit comprising at least one layer of surface, each of the at least one layer of surface comprising a die-cutting region, and a transferring region arranged at a center of the surface and being a strip-shaped region arranged along a width direction of the surface; the transferring region configured to transmit a tensile force to the die-cutting region to unfold the die-cutting region, a buffer layer formed by the die-cutting region that has been unfolded, and configured to cause the surface to expand along a thickness direction of the surface to play a buffering and protective role thereof; and wherein the at least one layer of surface comprises a plurality of surfaces, two ends of the plurality of surfaces connected to each other, the plurality of surfaces comprises only one die-cutting region, or two die-cutting regions, or a combination of the cushion unit with one die-cutting region and the cushion unit with two die-cutting regions, so that the die-cutting regions of the plurality of surfaces form the buffer layer with a three-dimensional network structure after the plurality of surfaces is stretched; and wherein the transferring regions of two adjacent layers of the surfaces are arranged in a staggered manner or not completely overlapped with each other, so that at least one layer of buffer layer is opposite to the other layer of the transferring region after two layers of die-cutting regions are unfolded.

13. A packaging bag comprising:
an outer bag body;
at least one cushion unit arranged on the outer bag body along a length direction of the cushion unit, and two sides of the cushion unit along a width direction of the cushion unit unconnected to the outer bag body; and wherein
when an object is put into to the packaging bag, a direction that the object is put into the packaging bag is consistent with the length direction of the cushion unit; the cushion unit unfolded along the direction that the object is put into the packaging bag, and expanded in a thickness direction of the cushion unit, to play a buffering and protective role thereof; and wherein
each of the at least one cushion unit comprises:

a first surface comprising at least one extension region unfolded along a length direction of the first surface to increase a length of the first surface;

at least one layer of second surface, two ends of the second surface along a length direction of the second surface respectively fixed at two ends of the first surface, a die-cutting region arranged on the second surface, and a length of the die-cutting region increased along with the extension region when the extension region is unfolded; and wherein the die-cutting region is unfolded to form a buffer layer that causes the second surface to expand along a thickness direction of the second surface to play a buffering and protective role thereof; and wherein a three-dimensional network structure is formed after the die-cutting region is unfolded.

14. The packaging bag as claimed in claim 13, wherein a width of the cushion unit is smaller than a width of the packaging bag; after the cushion unit is unfolded, the two sides of the cushion unit along the width direction of the cushion unit abut against two inner sides of the outer bag body, respectively, so that a confined space is formed between the outer bag body and the cushion unit.

15. The packaging bag as claimed in claim 13, wherein two ends of the cushion unit along the length direction of the cushion unit are respectively arranged near an inner wall of an opening of the outer bag body, and a center position of the cushion unit is suspended in the outer bag body; after the cushion unit is unfolded along the direction that the object is put into the packaging bag, the center position of the cushion unit moves to a bottom portion of the outer bag body.

16. The packaging bag as claimed in claim 15, wherein the at least one layer of second surface comprises a plurality of second surfaces arranged along a width direction of the first surface, edges of two adjacent second surfaces overlapped with each other.

* * * * *